United States Patent
Casaban-Julian et al.

(10) Patent No.: US 12,097,481 B2
(45) Date of Patent: Sep. 24, 2024

(54) PROCESS FOR PREPARING METAL ORGANIC FRAMEWORKS HAVING IMPROVED WATER STABILITY

(71) Applicant: MOF Technologies Limited, Belfast (GB)

(72) Inventors: Jose Casaban-Julian, Belfast (GB); John Breen, Belfast (GB); Conor Hamill, Belfast (GB)

(73) Assignee: MOF Technologies Limited, Belfast (GB)

( * ) Notice: Subject to any disclaimer, the term of this patent is extended or adjusted under 35 U.S.C. 154(b) by 836 days.

(21) Appl. No.: 17/260,525

(22) PCT Filed: Jul. 22, 2019

(86) PCT No.: PCT/GB2019/052051
§ 371 (c)(1),
(2) Date: Jan. 14, 2021

(87) PCT Pub. No.: WO2020/016617
PCT Pub. Date: Jan. 23, 2020

(65) Prior Publication Data
US 2021/0268476 A1  Sep. 2, 2021

(30) Foreign Application Priority Data
Jul. 20, 2018 (GB) ..................... 1811915

(51) Int. Cl.
*B01J 20/28* (2006.01)
*B01J 20/22* (2006.01)
*B01J 20/30* (2006.01)

(52) U.S. Cl.
CPC ....... *B01J 20/28011* (2013.01); *B01J 20/226* (2013.01); *B01J 20/28064* (2013.01);
(Continued)

(58) Field of Classification Search
CPC ............. B01J 20/28011; B01J 20/226; B01J 20/28064; B01J 20/28066; B01J 20/3007;
(Continued)

(56) References Cited

U.S. PATENT DOCUMENTS

2003/0222023 A1* 12/2003 Mueller ............ B01J 20/28042
210/656

FOREIGN PATENT DOCUMENTS

| CN | 106345435 A | 1/2017 |
| EP | 2 746 226 A2 | 6/2014 |

(Continued)

OTHER PUBLICATIONS

Qian et al (Imparting surface hydrophobicity to metal-organic frameworks using a facile solution-immersion process to enhance water stability for CO2 capture, Nanoscale, 2003) (Year: 2003).*

(Continued)

*Primary Examiner* — Samir Shah
*Assistant Examiner* — Logan Edward Laclair
(74) *Attorney, Agent, or Firm* — Heslin Rothenberg Farley & Mesiti, P.C.

(57) ABSTRACT

This invention relates to a continuous process for the preparation of a metal-organic framework comprising a hydrophobic compound. The process comprises the steps of: (a) providing a first component comprising either (i) a metal-organic framework, or (ii) a first reactant which includes at least one metal in ionic form and a second reactant which includes at least one ligand capable of associating with the metal in ionic form in order to form a metal-organic framework. (b) providing a hydrophobic compound, and (c) mixing the first component and the hydrophobic compound in order to form the metal-organic framework comprising the hydrophobic compound. The invention also relates to the use of a hydrophobic polymer, a silane compound and/or a (Continued)

Figure 1:
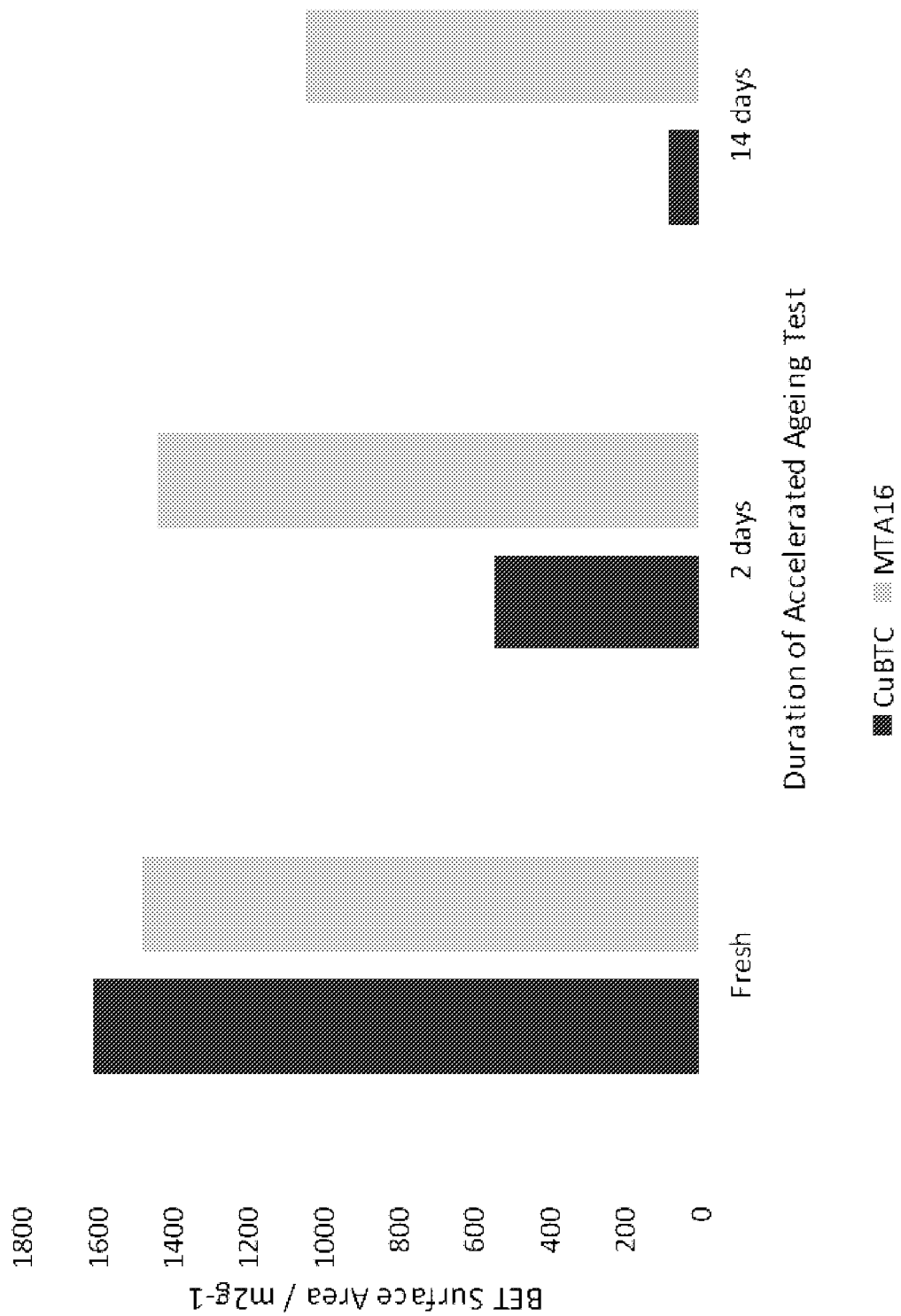

siloxane compound to improve the water stability of a metal-organic framework.

16 Claims, 17 Drawing Sheets

(52) U.S. Cl.
CPC ..... *B01J 20/28066* (2013.01); *B01J 20/3007* (2013.01); *B01J 20/3085* (2013.01); *B01J 2220/46* (2013.01)

(58) Field of Classification Search
CPC ................ B01J 20/3085; B01J 2220/46; B01J 20/28042
See application file for complete search history.

(56) References Cited

FOREIGN PATENT DOCUMENTS

| WO | WO-2006/050898 | A1 | 5/2006 |
|----|----------------|-----|--------|
| WO | WO-2014/013274 | A2 | 1/2014 |
| WO | WO-2014/118074 | A1 | 8/2014 |
| WO | WO-2017/089410 | A1 | 6/2017 |

OTHER PUBLICATIONS

Chemical Products (Surface Protection—Silane vs Siloxane vs Siliconate—How To Choose?) (Year: 2022).*
Carlos A. Fernandez et al "Hydrophobic and Moisture-Stable Metal-Organic Frameworks", Dalton Transcations, vol. 44, No. 3, Jan. 1, 2015; pp. 13490-13497.
Combined Search and Examination Report for GB Patent Appln No. 1811915.6 DTD Feb. 11, 2019.
International Search Report and Written Opinion on PCT/GB2019/052051 DTD Nov. 8, 2019.
Wang Zhang et al: A Facile and General Coating Approach to Moisture/Water-Resistant Metal-Organic Frameworks with Intact Porosity11 , Journal of the American Chemical Society, vol. 136, No. 49, Nov. 20, 2014 (Nov. 20, 2014), pp. 16978-16981.
Xukun Qian et al: "Imparting Surface Hydrophobicity to metal-organic Frameworks using a Facile Solution-Immersion Process to Enhance Water Stability for CO2 Capture", Nanoscale, vol. 9, No. 5, Jan. 1, 2017.

* cited by examiner

PROCESS FOR PREPARING METAL ORGANIC FRAMEWORKS HAVING IMPROVED WATER STABILITY

CROSS-REFERENCE TO RELATED APPLICATIONS

This application is a U.S. National Stage Application under 35 U.S.C. § 371 of International Patent Application No. PCT/GB2019/052051, filed on Jul. 22, 2019, which claims priority to United Kingdom Patent Application No. GB 1811915.6, filed on Jul. 20, 2018, the disclosure of each of which is incorporated herein by reference in its entirety.

This invention relates to a continuous process for the preparation of metal organic frameworks comprising a hydrophobic compound which have improved water stability, as well as to the use of certain compounds to improve the water stability of a metal-organic framework.

BACKGROUND

Metal organic frameworks (MOFs) are porous metal-organic compounds which may be crystalline or non-crystalline. They have particular pores or pore distributions and large specific surface areas. In recent times, they have become the object of comprehensive research work. Applications of MOFs include catalysis or separating, storing and releasing a variety of chemical compounds and gases.

Metal-organic frameworks are well-known in the art and have been given various names in the literature, including coordination polymers, metal-organic coordination networks (MOCNs) and porous coordination polymers (PCPs).

In MOFs, the organic groups bridge between metal ions so that a polymeric structure results. This polymeric network may extend in one, two or three dimensions. Of particular interest are those which extended in two or three dimensions since such structures may be porous. Specifically, they may contain pores which can accommodate other molecules.

When other molecules are adsorbed into the pores, the metal-organic framework may be described as a host and the adsorbed molecules may be described as guests. Adsorption of the guests into the pores may occur by simple exposure of the MOF to the guests when the guests are in liquid or gaseous form such that they can diffuse into the porous structure. The pores have specific sizes, shapes and chemical functionalities, which means that such materials can show selectivity for the adsorption of particular guests.

The property of porosity thus gives rise to potential applications such as those which require storage, separation or release of the guest species. For example, liquids or gases may be stored in such materials, mixtures of gases may be separated into their components using such materials, mixtures of liquids may be separated into their components using such materials, and guests may be released by such materials. In addition, such materials may function as catalysts by facilitating chemical changes in the guests, or as sensors for the guests through a guest-induced change in one or more of the physical properties of the MOF.

General information on different known MOFs and conventional synthesis methods are reported in a number of publications, including, "Metal-organic frameworks", James, S. L., Chemical Society Reviews 32 (2003) 276-288; "Metal-Organic Frameworks: A Rapidly Growing Class of Versatile Nanoporous Materials," Meek, S. T. et al., Advanced Materials 23 (2011) 249-267; Long, J. (ed.) Chemical Society Reviews, Metal Organic Frameworks theme issue, 2009, vol. 38. Chui et al., Science 283 (1999), 1148-1150, describe, for example, the preparation of the Cu-BTC MOF (also known as HKUST-1), in which a copper salt, viz. copper nitrate trihydrate is used as starting material and this salt and trimesic acid ($H_3BTC$) are dissolved in a solvent mixture of water and ethanol to synthesize the MOF material.

A method of preparing metal-organic compounds under pressure and shear forces is described in WO 2014/191725 A1, which is incorporated by reference herein in its entirety. WO 2006/050898 A1 and WO 2019/116007 A1, both of which are incorporated by reference herein in its entirety, relate to processes for preparing shaped bodies containing MOFs.

The use of a solution-immersion process to enhance the water stability of pre-formed MOFs is described in Qian, X. et al, Nanoscale, 2017, 9, 2003-2008. This process involves depositing a layer of organosilicone on the MOFs external surface. Zhang, Y. L. et al (J. Am. Chem. Soc., 2014, 136, 16978-16981) describe an alternative approach to attempting to enhance moisture stability in which pre-formed MOFs are coated with volatile and low molecular weight silicone molecules obtained from the thermal degradation of polydimethylsiloxane. However, both of these processes involve batch production rather than continuous production.

Improved processes for preparing MOFs having moisture and water stability, which allow continuous production, as well as MOFs having these properties, have been sought.

STATEMENT OF INVENTION

According to a first aspect, this invention relates to a continuous process for the preparation of a metal-organic framework (MOF) comprising a hydrophobic compound, the process comprising the steps of:
(a) providing a first component comprising either (i) a metal-organic framework, or (ii) a first reactant which includes at least one metal in ionic form and a second reactant which includes at least one ligand capable of associating with the metal in ionic form in order to form a metal-organic framework,
(b) providing a hydrophobic compound, and
(c) mixing the first component and the hydrophobic compound in order to form the metal-organic framework comprising the hydrophobic compound.

In relation to the invention, the word "continuous" is used to refer to a flow production method which allows continuous input of the first component and the hydrophobic compound, and continuous output of the metal-organic framework (MOF) comprising the hydrophobic compound.

The term "hydrophobic" is used in relation to this invention to refer to a substance whose surface, when the substance is in the form of a solid, has a water contact angle of greater than 50°. In some embodiments, the water contact angle may be greater than 90°.

Advantages of the method of the invention include that it can be run continuously, it is more consistent, it is simpler and faster, and is easier to scale-up. The method does not require the high temperatures of prior art methods. In addition, it can allow the formation of hydrophobic compound-containing MOFs in a single mixing step. Shaped bodies can also be formed. The resulting materials (ie hydrophobic compound-containing MOFs) can be used as catalysts, in items of personal protective equipment and in sensors. They can also be used in methods of adsorbing a gas or liquid, comprising the step of contacting the gas or liquid with the MOF comprising a hydrophobic compound. The gas may be selected from $CO_2$, $NO_x$, $H_2O$, $NH_3$ and mixtures thereof.

In some embodiments, the hydrophobic compound is added as a solid (for example, through a feeder). In other embodiments, step (b) may comprise providing a solution comprising a hydrophobic compound, and step (c) may comprise mixing the first component and the solution in order to form the metal-organic framework comprising the hydrophobic compound. In particular, the hydrophobic compound may be a hydrophobic polymer, a silane compound and/or a siloxane compound.

In some embodiments, step (b) may comprise providing a solution comprising a silane compound and/or a siloxane compound, and step (c) may comprise mixing the first component and the solution in order to form the metal-organic framework comprising the silane compound and/or the siloxane compound.

In some embodiments, in step (a) the first component may comprise option (ii). In particular, in step (a) the first and second reactants may be capable of forming any of the MOFs described below.

In particular, in step (a) the first reactant may be a salt, or in salt form, such as a nitrate, nitrite, sulfate, hydrogen sulphate, oxide, halide, acetate, oxide, hydroxide, benzoate, alkoxide, carbonate, acetylacetonate, hydrogen carbonate, fluoride, chloride, bromide, iodide, phosphate, hydrogen phosphate, dihydrogen phosphate, or the like. More particularly, the first reactant may be a hydroxide. Suitable metals in ionic form include the metal ions listed below. For example, the first reactant may be copper (II) hydroxide.

In particular, in step (a) the second reactant may include at least one ligand, more particularly at least one organic ligand, even more particularly at least one at least bidentate organic bridging ligand. In the context of the present invention, the term "at least bidentate organic compound" is used to refer to an organic compound comprising at least one functional group which is able to form at least two, preferably two, coordinative bonds to a given metal ion and/or to form one coordinative bond each to two or more, preferably two, metal atoms. In particular, the second reactant may be an organic ligand as described below.

Examples of functional groups to be mentioned, via which the said coordinative bonds can be formed, include the following functional groups in particular:—$CO_2H$, —$SO_3H$, —$Si(OH)_3$, —$PO_3H$, —CN, —$NH_2$, —NHR or —$NR_2$. Two or more such groups may be attached to an organic group, R', which, for example, is preferably an alkylene group having 1, 2, 3, 4 or 5 carbon atoms such as e.g. a methylene, ethylene, n-propylene, i-propylene, n-butylene, i-butylene, t-butylene or n-pentylene group or an aryl group containing one or two aromatic nuclei such as e.g. two C6 rings which may or may not be condensed and, independently of one another, can be substituted in a suitable manner by at least one substituent each, and/or which, independently of one another, can each contain at least one heteroatom such as e.g. N, O and/or S. The at least two functional groups can in principle be bound to any suitable organic compound, as long as there is the assurance that the organic compound having these functional groups is capable of forming the coordinative bond and of producing the framework material.

More particularly, the organic compounds comprising the at least two functional groups may be derived from a saturated or unsaturated aliphatic compound or an aromatic compound or a compound which is both aliphatic and aromatic.

In particular, the aliphatic compound or the aliphatic moiety of the both aliphatic and aromatic compound may be linear and/or branched and/or cyclic, a plurality of cycles per compound also being possible. More particularly, the aliphatic compound or the aliphatic moiety of the both aliphatic and aromatic compound may comprise from 1 to 15, more particularly from 1 to 14, more particularly from 1 to 13, more particularly from 1 to 12, more particularly from 1 to 11 and even more particularly from 1 to 10 C atoms such as e.g. 1, 2, 3, 4, 5, 6, 7, 8, 9 or 10 C atoms. Particularly mentioned in this context are, inter alia, methane, adamantane, acetylene, ethylene butadiene and benzene.

More particularly, the aromatic compound or the aromatic moiety of the both aromatic and aliphatic compound can have one or alternatively more nuclei such as e.g. 2, 3, 4 or 5 nuclei, with the option of the nuclei being separate and/or at least two nuclei being present in condensed form. In particular, the aromatic compound or the aromatic moiety of the both aliphatic and aromatic compound may have 1, 2 or 3 nuclei, more particularly one or two nuclei. Independently of one another, each nucleus of the above mentioned compound may further comprise at least one heteroatom such as e.g. N, O, S, B, P, Si, Al, in particular N, O and/or S. More particularly, the aromatic compound or the aromatic moiety of the both aromatic and aliphatic compound may comprise one or two $C_6$ nuclei, the two nuclei being either separate or being present in condensed form. Aromatic compounds to be mentioned in particular are imidazolate, benzene, naphthalene and/or biphenyl and/or bipyridyl and/or pyridine.

Examples to be mentioned within the scope of the present invention of imidazole-based ligands are imidazole, 2-methylimidazole, 2-ethylimidazole and benzimidazole.

Examples to be mentioned within the scope of the present invention:

(a) of dicarboxylic acids are:

1,4-butanedicarboxylic acid, tartaric acid, glutaric acid, oxalic acid, 4-oxo-pyran-2, 6-dicarboxylic acid, 1,6-hexanedicarboxylic acid, decane dicarboxylic acid, 1,8-heptadecane dicarboxylic acid, 1,9-heptadecanedicarboxylic acid, heptadecanedicarboxylic acid, acetylene dicarboxylic acid, 1,2-benzenedicarboxylic acid, 2,3-pyridinedicarboxylic acid, 2,3-pyridine-dicarboxylic acid, 1,3-butadiene-1,4-dicarboxylic acid, 1,4-benzenedicarboxylic acid, 1,3-benzenedicarboxylic acid, imidazole-2,4-dicarboxylic acid, 2-methyl-quinoline-3, 4-dicarboxylic acid, quinoline-2,4-dicarboxylic acid, quinoxaline-2,3-dicarboxylic acid, 6-chloroquinoxaline-2,3-dicarboxylic acid, 4,4l-diaminphenylmethan-3,3'-dicarboxylic acid, quinoline-3,4-dicarboxylic acid, 7-chloro-4-hydroxyquinoline-2,8-dicarboxylic acid, diimiddi-carboxylic acid, pyridine-2,6-dicarboxylic acid, 2-methylimidazole-4,5-dicarboxylic acid, thiophene-3,4-dicarboxylic acid, 2-isopropyl-4,5-dicarboxylic acid, tetrahydropyrane-4,4-dicarboxylic acid, perylene-3,9-dicarboxylic acid, perylenedicarboxylic, pluriol E 200-dicarboxylic acid, 3,6-dioxaoctanedicarboxylic acid, 3,5-cyclohexadiene-1,2-dicarboxylic acid, octanecarboxylic acid, pentane-3,3-carboxylic acid, 4,4'-diamino-1,1'-diphenyl-3,3'-dicarboxylic acid, 4,4'-diaminodiphenyl-3,3'-dicarboxylic acid, benzidine-3,3'-dicarboxylic acid, 1,4-bis-(phenylamino)-benzene-2,5-dicarboxylic acid, 1-1'dinaphthyl-8,8'-dicarboxylic acid, 7-chloro-8-methylquinoline-2,3-dicarboxylic acid, 1-anilinoanthraquinone-2,4'-dicarboxylic acid, polytetrahydrofuran-250-dicarboxylic acid, 1,4-bis-(carboxymethyl)-piperazin-2,3-dicarboxylic acid, 7-chloroquinoline-3, 8-dicarboxylic acid, 1-(4-carboxy)-phenyl-3-(4-chloro)-phenyl-pyrazolin-4,5-dicarboxylic acid, 1,4,5,6,7,7-hexachloro-5-norbornene-2,3-dicarboxylic acid, phenylindanedicarboxylic acid, 1,3-dibenzyl-2-oxo-imidazolidine-4,5-dicarboxylic acid, 1,4-cyclohexanedicarboxylic acid, naphthalene-1,8-dicarboxylic acid, 2-Benzoylbenzol-1,3-dicarboxylic acid, 1,3-dibenzyl-2-oxo-imidazolidine-4,5-cis-dicarboxylic acid, 2,2 '-biquinoline-4,4'-di-carboxylic acid, pyridine-3,4-dicarboxylic acid, 3,6,9-trioxaundecanedicarboxylic acid, 0-hydroxy-benzophenone-dicarboxylic acid, Pluriol E 300-dicarboxylic acid, Pluriol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazine dicarboxylic acid, 4,4'-diaminodiphenyl ether-di-imidedicarboxylic acid, 4,4'-diaminodiphenylmethanediimidedicarboxylic acid, 4,4'-diamino-diphenylsulfone diimidedicarboxylic acid, 2,6-naphthalene dicarboxylic acid, 1,3-adamantanedicarboxylic, 1,8-naphthalenedicarboxylic acid, 2,3-naphthalenedicarboxylic acid, 8-Methoxy-2,3-naphthalenedicarboxylic acid, 8-nitro-2, 3-naphthoic acid, 8-sulfo-2,3naphthalindicarboxylic acid, anthracene-2,3-dicarboxylic acid, 2',3'-diphenyl-p-terphenyl4,4'-dicarboxylic acid, diphenyl-4,4'-dicarboxylic acid, imidazole-4,5-dicarboxylic acid, 4 (1H)-oxo-thiochromen-2, 8-dicarboxylic acid, 5-tert-butyl-1,3-benzenedicarboxylic acid, 7,8-quinolinedicarboxylic acid, 4,5-imidazoledicarboxylic acid, 4-cyclohexene-1,2-dicarboxylic acid, hexatriacontandicarboxylic acid, tetradecanedicarboxylic acid, 1,7-heptanedicarboxylic acid, 5-hydroxy-1,3-benzenedicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxy-diphenylmethane-3,3'-dicarboxylic acid, 1-amino-4-methyl-9, 10-dioxo-9, 10-dihydroanthracene-2.3-dicarboxylic acid, 2,5-pyridinedicarboxylic acid, cyclohexene-2,3-dicarboxylic acid, 2,9-Dichlorfluorubin-4, 11-dicarboxylic acid, 7-chloro-3-methylquinoline-6,8-dicarboxylic acid, 2,4-dichlorobenzophenone-2'5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid, 1,14-tetradecane,5,6-dehydronorbornan-2,3-dicarboxylic acid or 5-ethyl-2,3-pyridinedicarboxylic acid, (b) of tricarboxylic acids are:
2-hydroxy-1,2,3-propanetricarboxylic acid, 7-chloro-2,3,8-quinolinetritri carboxylic acid, 1,2,4-benzenetricarboxylic acid, 1,2,4-butanetricarboxylic acid, 2-phosphono-1,2,4-butanetricarboxylic acid, 1,3,5-benzenetricarboxylic acid, 1-hydroxy-1,2,3-propane,4,5-dihydro-4,5-dioxo-1H-pyrrolo[2,3-F]quinoline-2,7,9-tricarboxylic acid, 5-acetyl-3-amino-6-methylbenzene-1,2,4-tricarboxylic acid, 3-amino-5-benzoyl-6-methylbenzene-1,2,4-tricarboxylic acid, 1,2,3-propanetricarboxylic acid or aurinetricarboxylic acid, (c) of tetratricarboxylic acids are:
1,1-dioxide-perylo[1,12-BCD]thiophene-3,4,9,10-tetracarboxylic acid, perylenetetracarboxylic acids such as perylene3,4,9,10-tetracarboxylic acid or perylene-1,12-sulfone-3,4,9,10-tetracarboxylic acid, butanetetracarboxylic acids such as 1,2,3,4-butanetetracarboxylic acid or meso-1,2,3,4-butanetetracarboxylic acid, decane-2,4,6,8-tetracarboxylic acid, 1,4,7,10,13,16-hexaoxacyclooctadecane-2,3,11,12-tetracarboxylic acid, 1,2,4,5-benzenetetracarboxylic acid, 1,2,11,12-dodecanetetracarboxylic acid, 1,2,5,6-hexanetetracarboxylic acid, 1,2,7,8-octanetetracarboxylic acid, 1,4,5,8-naphthalenetetracarboxylic acid, 1,2,9,10-decanetetracarboxylic acid, benzophenonetetracarboxylic acid, 3,3',4,4'-benzophenonetetracarboxylic acid, tetrahydrofilrantetracarboxylic acid or cyclopentanetetracarboxylic acids such as cyclopentane-1,2,3,4-tetracarboxylic acid.

Most especially preferred within the scope of the present invention is the use, where suitable, of at least monosubstituted mono-, di-, tri-, tetra- or polynuclear aromatic di, tri- or tetracarboxylic acids, each of the nuclei optionally comprising at least one heteroatom, where two or more nuclei may comprise identical or different heteroatoms. Preferred, for example, are mononuclear dicarboxylic acids, mononuclear tricarboxylic acids, mononuclear tetracarboxylic acids, dinuclear dicarboxylic acids, dinuclear tricarboxylic acids, dinuclear tetracarboxylic acids, trinuclear dicarboxylic acids, trinuclear tricarboxylic acids, trinuclear tetracarboxylic acids, tetranuclear dicarboxylic acids, tetranuclear tricarboxylic acids and/or tetranuclear tetracarboxylic acids. Examples of suitable heteroatoms are N, O, S, B, P, Si, Al, preferred heteroatoms in this context being N, S and/or O. Suitable substituents to be mentioned in this respect are, inter alia, —OH, a nitro group, an amino group or an alkyl or alkoxy group.

Accordingly, the present invention also relates to a method as described above, wherein the at least bidentate organic compound used is an aromatic di-, tri- and/or tetracarboxylic acid.

In particular, the at least bidentate organic compounds used in the method according to the invention may be acetylenedicarboxylic acid (ADC), benzenedicarboxylic acids, naphthalenedicarboxylic acids, biphenyldicarboxylic acids such as e.g. 4,4'-biphenyldicarboxylic acid (BPDC), bipyridinedicarboxylic acids such as e.g. 2,2'-bipyridinedicarboxylic acids such as e.g. 2,2'-bipyridine-5,5'-dicarboxylic acid, benzenetricarboxylic acids such as e.g. 1,2,3-benzenetricarboxylic acid or 1,3,5-benzenetricarboxylic acid (BTC), adamantanetetracarboxylic acid (ATC), adamantanedibenzoate (ADB) benzenetribenzoate (BTB), methanetetrabenzoate (MTB), adamantanetetrabenzoate or dihydroxyterephthalic acids such as e.g. 2,5 dihydroxyterephthalic acid (DHBDC).

More particularly within the scope of the present invention may be the use of, inter alia, terephthalic acid, 2,5-dihydroxyterephthalic acid, 1,2,3-benzenetricarboxylic acid, 1,3,5-benzenetricarboxylic acid or 2,2'-bipyridine-5,5'-dicarboxylic acid. In particular, 1,3,5-benzenetricarboxylic acid may be used.

In particular, the first component and the hydrophobic compound may be mixed in step (c) in a weight ratio of between 0.005:1 and 4:1 (hydrophobic compound: MOF), more particularly between 0.01:1 and 1.5:1 (hydrophobic compound: MOF), even more particularly between 0.05:1 and 0.7:1 (hydrophobic compound: MOF).

In particular, in step (c), the mixing may be by stirring (e.g. with a food mixer), sonication, under conditions of prolonged and sustained pressure and shear, or, when step (b) comprising providing a solution comprising the hydrophobic compound, stirring either above or below the reflux temperature of the solution. More particularly, in step (c), the mixing may be under conditions of prolonged and sustained pressure and shear. In particular, the conditions of prolonged and sustained pressure and shear may be applied by an extrusion process. More particularly, the extrusion process may be a screw-based extrusion process, more particularly a twin-screw extrusion process.

In particular, in step (c), the mixing may be carried out at a temperature of less than 150° C., more particularly less than 100° C., in some embodiments less than 50° C., even more particularly less than 35° C. In particular, in step (c), the mixing may be carried out at a temperature greater than 0° C., more particularly greater than 10° C., even more particularly greater than 15° C.

More particularly, the method may comprise, after step (c), a further step of (d) drying the metal-organic framework comprising the hydrophobic compound. In particular, the drying may be under vacuum, under an inert atmosphere or in air. More particularly at a temperature of less than 200° C., more particularly less than 100° C., even more particularly less than 50° C., more particularly less than 30° C. In particular, the drying may be under vacuum at a temperature greater than 0° C., more particularly greater than 10° C., even more particularly great than 20° C.

In particular, the method may comprise, after step (c) or, if step (d) is followed, after step (d), a further step of (e) forming a shaped body comprising the metal-organic framework.

More particularly, step (b) of the process may comprise providing a solution comprising the hydrophobic compound.

Suitable metals in ionic form and ligands (linkers) are listed in Table 1 below.

TABLE 1

| | Carboxylates | Imidazoles | Heterocycles containing elements such as N, O, S, B, P | Sulfonates |
|---|---|---|---|---|
| Organic Linkers | Phosphonates | peptides | Carboranes | polyoxometalates |
| | i) including mixtures of above mentioned linkers | | | |
| | ii) including derivatives of the above linkers with functional groups such as halogens, amines, alkyl groups, esters, ethers, silyl groups, acetylenes, hydroxyls, carboxyls, thio groups, azide groups, amides, aryl groups, alkenyl groups, alkynyl groups etc.) | | | |
| | Alkaline | Transition metals | Lanthanide | Actinide |
| Metal ions | Post-transition metals | | | |
| | i) including mixtures of the above mentioned metal ions | | | |
| | ii) including the corresponding metal clusters | | | |
| Linkers which are inorganic anions | $SiF_6$ | $TiF_6$ | oxalate | |

In particular, the at least one metal in ionic form may be selected from: Lit, $Na^+$, $K^+$, $Mg^{2+}$, $Ca^{2+}$, $Sr^+$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Cr^{4+}$, $Cr^{6+}$, $Mo^{3+}$, $Mo^{6+}$, $W^{3+}$ $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$ $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pd^{4+}$, $Pt^{2+}$, $Pt^+$, $Pt^{4+}$, $Cu^{2+}$, $Cu^+$, $Ag^+$, $Au^+$, $Au^{3+}$, $Zn^{2+}$, $Cd^{2+}$, $Hg^{2+}$, $Al^{3+}$, $Ga^{3+}$, $In^{3+}$, $Ti^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$, $Bi^+$ and as well as lanthanide ions such as $La^{3+}$, $Ce^{3+}$, $Ce^{4+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$ and actinide ions such as $Th^{3+}$, $Pa^{3+}$, $U^{3+}$, $U^{6+}$, $Np^{3+}$, $Pu^{3+}$, $Am^{3+}$, $Cm^{3+}$, $Bk^{3+}$, $Cf^{3+}$, $Es^{3+}$, $Fm^{3+}$, $Md^{3+}$, $No^{3+}$ and $Lr^{3+}$.

More particularly, the metal ion may be $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$ $Cr^{3+}$, $Mo^{3+}$, $W^{3+}$ $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, Nit, $Pd^{2+}$, $Pd^+$, $Pt^{2+}$, $Pt^+$, $Cu^{2+}$, Cut, $Ag^+$, $Au^+$, $Zn^{2+}$, $Cd^{2+}$, $Hg^{2+}$, $Al^{3+}$, $Ga^{3+}$, $In^{3+}$, $Ti^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$ and $Bi^+$. In particular, the metal ion may be $Cu^{2+}$, Cut, $Fe^{2+}$, $Fe^{3+}$, $Zn^{2+}$, $Co^{3+}$, $Co^{2+}$ and $Mg^{2+}$. More particularly, the metal ion may be $Cu^{2+}$, Cut and $Zn^{2+}$, even more particularly $Cu^{2+}$.

More particularly, the at least one ligand may be an organic ligand. In particular, the ligand may be selected from organic ligands selected from carboxylates, imidazoles, sulfonates, phosponates, peptides, carboranes, polyoxymetalates, heterocycles, and derivatives thereof; and mixtures thereof; and inorganic ligands selected from $SiF_6$, $TiF_6$ and oxalate and mixtures thereof. More particularly, the organic ligand may be a carboxylate, even more particularly a trimesate. Further definition of suitable organic ligands and substances from which they can be formed is set out below in relation to the process of the invention.

More particularly, MOFs formed by the process of the invention may include those shown in Table 2 below.

TABLE 2

| MOF-5 | MOF-177 | MOF-74/CPO-27 | MOF-210 | MOF-505 |
|---|---|---|---|---|
| MOF-200 | MOF-253 | MOF-508 | IMOF-3 | MOF-4 |
| MOF-602 | MOF-603 | MOF-2 | Sod-ZMOF | Rho-ZMOF |
| MOF-205 | ZIF-14 | ZIF-65 | ZIF-25 | ZIF-10 |
| ZIF-93 | ZIF-97 | ZIF-11 | ZIF-12 | ZIF-3 |
| ZIF-22 | ZIF-20 | ZIF-21 | ZIF-9 | ZIF-23 |
| ZIF-90 | ZIF-71 | ZIF-78 | ZIF-68 | ZIF-81 |
| ZIF-82 | ZIF-96 | ZIF-79 | ZIF-70 | ZIF-95 |
| ZIF-69 | ZIF-100 | ZIF-6 | CPL-11 | CPL-2 |
| BIF-2Li | BIF-2Cu | BIF-9 | BIF-4 | BIF-10 |
| BIF-6 | BIF-7 | BIF-8 | BIF-3 | BIF-5 |
| TIF-1 | TIF-2 | TIF-5 | TIF-3 | TIF-4 |
| PCN-6 | PCN-14 | PCN-66 | PCN-12 | PCN-224 |
| PCN-9 | PCN-13 | PCN-17 | PCN-333 | PCN-225 |
| PCN-332 | PCN-250 | PCN-222 | PCN-61 | PCN-521 |
| PCN-46 | PCN-223 | UMCM-2 | UMCM-150 | UMCM-1 |
| MIL-53; MIL-53(Al) | MIL-100 | MIL-101 | MIL-96 | MIL-47 |
| MIL-102 | MIL-117; MIL-142A | MIL-141 | MIL-140 | MIL-88 |
| MIL-120 | MIL-84 | MIL-91 | SNU-25 | SNU-50' |
| SNU-15 | SNU-M10 | SNU-M11 | SNU-21S | SNU-21H |
| SNU-30 | SNU-3 | SNU-9 | SNU-21 | SNU-31' |
| DUT-10 | DUT-4 | DUT-51 | DUT-13 | DUT-6 |
| NOTT-100 | NOTT-140 | NOTT-140a | NOTT-107 | NOTT-109 |
| NOTT-300 | NOTT-116 | UMCM-150 | USO-2-Ni | USO-3-In |
| USO-1-AI-A | MSF-2 | Cu-BTTri | ELM-11 | Ni-STA-12 |
| IRMOF-11 | IRMOF-6 | IRMOF-62 | IRMOF-3 | MOP-23 |
| Mn(pmdc) | Co(tlmb) | YO-MOF | Cd-ADA-1 | CdIF-9 |
| Cu-EBTC | $Zn_2$(BTetB) | $Cu_2$(bptb) | ELM-31 | NU-100 |
| NU-135 | NU-125 | NU-140 | NU-111 | NU-700 |
| Zn(3,5-pydc)(DMA) | $H_3(Cu_4Cl)_3$(BTTri)$_8$ | $Cu_2$(imta)(DMSO) | Co(dcdd) | $Co_4((OH)_2$(dcdd)$_3$ |
| $Cd_2$(tzc)$_2$ | $Mn(HCO_2)_2$ | $Cu_2I_2$(bttp4) | Cu(1,4-ndc) | Zn(bchp) |
| $Ni_2$(pbmp) | Zn(3,5-pydc)(DMA) | $Zn_4$O(bmpbdc)$_3$ | Cu-TDPAT | $Zn_2$(bdc)$_2$(dabco) |
| UTSA-16 | UTSA-20 | UTSA-34 | UTSA-40 | UTSA-38 |
| UTSA-100 | UTSA-100a | ZJU-5 | ZJU-25 | ZJU-35 |
| Cu-TaTB-30 | CAU-1; CAU-10-H | UoC-1 | Co-BDP | MFU-4 |
| $Zn_4$O(bfbpdc)$_3$ | HNUST-2 | HNUST-3 | UiO-67 | Cu(fma) |
| $Cu_2$(sdc)$_2$(ted) | $Cu_3$(tatb) | $Cu_3$(btb) | $Zn_4$O(fma)$_3$ | MTAF-4 |
| NPC-5 | NJFU-2 | MCM-41 | MAF-49 | MAF-2 |
| $CU_3$(btc)$_2$ | $Zn_4$O(dmcapz)$_3$ | FMOF-1 | FMOF-2 | Co(dcdd)(py)$_2$ |
| ELM-11 | $Zn_2$(bmebdc)$_2$(bipy) | CUK-1 | CUK-2 | ZJNU-41 |
| ZJNU-42 | ZnCar•DMF | MPF-2 | MPF-9 | VSB-3 |

TABLE 2-continued

| bio-MOF-1 | bio-MOF-11 | HLJU-1 | HLJU-2 | IFMC-200 |
|---|---|---|---|---|
| NENU-3 | NENU-28 | NENU-29 | NENU-15 | NENU-11 |
| TMOF-1 | Cu-BTT | Ni-BTT | ITHD | NPC-5 |
| MOP-1 | BUT-10 | BUT-11 | SIFSIX-2-Cu | SIFSIX-2-Cu-i |
| ELM-11 | DO-MOF | oCB-MOF-1 | PCMOF-5 | CDMOF-2 | i) including isostructural MOFs with different metal ions and/or linkers

In particular, the MOF may be selected from HKUST-1, ZIF-8, Al(fumarate)(OH), SIFSIX-3-Zn, SIFSIX-3-Cu, UiO-66-NH$_2$, UiO-66, Zr(fumarate), ZIF-67, MOF-5, IRMOF-3, UIO-67, CAU-10, SIFSIX-3-Ni, MIL-53, MIL-101, NOTT-100, PCN-14, SIFSIX-3-Co, ZIF-90, ZIF-7, BIT-101, Mg-formate, TIFSIX-3-Ni, MIL-100, MOF-74, MOF-177, CuBTTri, IRMOF-3, MOF-5CH3, PCN-222, and UiO-66-CH3. More particularly the MOF may be HKUST-1. (ie copper trimesate, CuBTC) or Cu-MOF-74.

In particular, the hydrophobic compound may be a hydrophobic polymer, a silane compound and/or a siloxane compound. More particularly, the hydrophobic polymer may be an acrylic, amide, imide, carbonate, diene, ester, ether, fluorocarbon, olefin, styrene, vinyl acetal, vinyl acetate, vinyl, vinylidene chloride, vinyl ester, vinyl ether, vinyl ketone, vinylpyridine, vinylpyrrolidone, silane or siloxane polymer.

In particular, the acrylic polymer may be an acrylate polymer, an acrylonitrile polymer or copolymer, a maleic anhydride copolymer or a methacrylate polymer or copolymer. Examples of suitable acrylate polymers include poly(butyl acrylate), poly(tert-butyl acrylate-co-ethyl acrylate-co-methacrylic acid), poly(ethyl acrylate), poly(2-ethylhexyl acrylate) and Poly(methyl acrylate). Examples of suitable acrylonitrile polymers or copolymers include polyacrylonitrile and poly(acrylonitrile-co-methyl acrylate) acrylonitrile. Examples of suitable maleic anhydride copolymers include poly(maleic anhydride-alt-1-octadecene) and poly(styrene-co-maleic anhydride). Examples of suitable methacrylate polymers or copolymers include poly(butyl methacrylate), poly(butyl methacrylate-co-isobutyl methacrylate), poly(butyl methacrylate-co-methyl methacrylate), poly(cyclohexyl methacrylate), poly(2-ethylhexyl methacrylate), poly(ethyl methacrylate), poly(methyl methacrylate-co-ethyl acrylate), poly(methyl methacrylate-co-ethylene glycol dimethacrylate), poly(methyl methacrylate), poly(methyl methacrylate-co-methacrylic acid), poly(octadecyl methacrylate), poly(tetrahydrofurfuryl methacrylate), and poly(tetrahydrofurfuryl methacrylate-co-ethyl methacrylate).

Examples of suitable amide and imide polymers include Nylon 6, Nylon 6/6, Nylon 6/12, Nylon 11, Nylon 12, poly(3,3',4,4'-biphenyltetracarboxylic dianhydride-co-1,4-phenylenediamine), polyetherimide, polylauryllactam-block-polytetrahydrofuran, poly[N,N'-(1,3-phenylene)isophthalamide] and poly(pyromellitic dianhydride-co-4,4'-oxydianiline).

Examples of suitable carbonate polymers include poly(Bisphenol A carbonate) and poly(propylene carbonate).

Examples of suitable diene polymers include poly(acrylonitrile-co-butadiene) acrylonitrile, poly(acrylonitrile-co-butadiene), dicarboxy terminated, polybutadiene, polychloroprene, polyisoprene and poly(styrene-co-butadiene).

Examples of suitable ester polymers include poly(1,4-butylene adipate), poly(1,4-butylene succinate), poly(1,4-butylene terephthalate), poly(diallyl isophthalate), Poly(dimer acid-co-alkyl polyamine), poly(ethylene adipate), poly(ethylene succinate), poly(ethylene terephthalate, poly[trimethylolpropane/di(propylene glycol)-alt-adipic acid/phthalic anhydride] and polyol.

Examples of suitable ether polymers include polyepichlorohydrin, oxymethylene, propylene glycol, O-(2-Aminopropyl)-O'-(2-methoxyethyl)polypropylene glycol, poly(ethylene glycol-ran-propylene glycol), poly(propylene glycol), poly(propylene glycol) bis(2-aminopropyl ether), poly(propylene glycol) diglycidyl ether, poly(propylene glycol) methacrylate average, poly(propylene glycol) monobutyl ether, di(propylene glycol) butyl ether, di(propylene glycol) dimethyl ether, di(propylene glycol) propyl ether, ethylene glycol monophenyl, propylene glycol butyl ether, propylene glycol propyl ether, tripropylene glycol, tri(propylene glycol) butyl ether, tri(propylene glycol) methyl ether, tri(propylene glycol) propyl ether and poly(tetrahydrofuran).

Examples of suitable fluorocarbon polymers include graphite, fluorinated, polymer; a perfluoropolymer such as Hyflon®; 1,1,2,2,9,9,10,10-octafluoro[2.2]paracyclophane; poly(chlorotrifluoroethylene); poly(ethylene-co-tetrafluoroethylene); poly(tetrafluoroethylene); poly(tetrafluoroethylene); poly(tetrafluoroethylene-co-perfluoro(propylvinyl ether); poly(vinylidene fluoride); poly(vinylidene fluoride-co-hexafluoropropylene) and Solvene®.

Examples of suitable olefin polymers include polybutenes, poly(l-decene), poly(dicyclopentadiene-co-p-cresol), polyisobutylene, poly(isobutylene-alt-maleic anhydride), poly(maleic anhydride-alt-1-octadecene), poly(4-methyl-1-pentene), poly[[octahydro-5-(methoxycarbonyl)-5-methyl-4,7-methano-1H-indene-1,3-diyl]-1,2-ethanediyl], polyethylene, poly(ethylene-co-acrylic acid) acrylic acid, poly(ethylene-co-acrylic acid) zinc salt, poly(ethylene-co-ethyl acrylate) ethyl acrylate, poly(ethylene-co-glycidyl methacrylate), polyethylene-graft-maleic anhydride, poly(ethylene-co-methacrylic acid), poly(ethylene-co-methyl acrylate-co-glycidyl methacrylate), polyethylene monoalcohol, poly(ethylene-co-propylene-co-5-methylene-2-norbornene) ethylene, poly(ethylene-co-vinyl acetate) vinyl acetate and stearic acid N-hydroxysuccinimide ester.

Examples of suitable styrene polymers include polypropylene and polystyrene.

Examples of suitable vinyl polymers include polyacenaphthylene, poly(4-bromostyrene), poly(4-tert-butylstyrene), poly(4-chlorostyrene), poly(2,6-dichlorostyrene), poly(4-methylstyrene), poly(vinylbenzyl chloride, poly(4-vinylbiphenyl), polyvinylcyclohexane, poly(4-vinylphenol), poly(4-vinylphenol-co-methyl methacrylate), poly(vinyltoluene-co-α-methylstyrene), poly(vinyl butyral-co-vinyl alcohol-co-vinyl acetate, poly(vinyl formal), poly(vinyl chloride), poly(vinylidene chloride-co-acrylonitrile), poly(vinyl acetate), poly(vinyl pyrrolidone), poly(vinyl cinnamate), poly(ethyl vinyl ether), VEctomer®, poly(4-vinylpyridine), poly(4-vinylpyridine-co-butyl methacrylate), poly(4-vinylpyridine hydrochloride), poly(4-vinylpyridine-co-styrene), poly[4-vinylpyridinium poly(hydrogen fluoride)], poly(4-vinylpyridinium p-toluenesulfonate), poly(vinylpolypyrrolidone), poly(l-vinylpyrrolidone-co-2-dimethylaminoethyl methacrylate), poly(l-vinylpyrrolidone-co-styrene), poly(l-vinylpyrrolidone)-graft-(1-triacontene) and poly(l-vinylpyrrolidone-co-vinyl acetate). In particular, the vinyl polymer may be poly(vinyl pyrrolidone). More particularly, when the hydrophobic polymer is poly(vinyl pyrrolidone), i.e. PVP, the metal-organic framework may be Cu-MOF-74 or HKUST-1.

In particular, the siloxane compound and/or the silane compound may be a hydrophobic polymer as defined above. More particularly, the siloxane compound may be selected from octamethyltrisiloxane, polydimethyl siloxane, methylmethoxy siloxane, phenylmethoxy siloxane, methyl silsesquioxane and phenyl silsesquioxane, and mixtures thereof. In particular, the silane compound may be selected from trimethoxy(methyl)silane. More particularly, the silane or siloxane compound may be selected from octamethyltrisiloxane, trimethoxy(methyl)silane, polydimethyl siloxane and mixtures thereof. Even more particularly, step (b) may comprise providing a solution comprising the silane compound and the siloxane compound, for example as a mixture comprising octamethyltrisiloxane, polydimethyl siloxane, methylmethoxy siloxane, phenylmethoxy siloxane, methyl silsesquioxane, phenyl silsesquioxane and trimethoxy(methyl)silane. For example, the mixture may comprise 60-70 wt % octamethyltrisiloxane; 25-35 wt % of polydimethyl siloxane, methylmethoxy siloxane, phenylmethoxy siloxane, methyl silsesquioxane and phenyl silsesquioxane; and 0.5-2.5 wt % trimethoxy(methyl)silane. Examples of suitable mixtures include DOWSIL HC 1000, DC 3-1965 and DC 1-2577 produced by Dow Corning®. In particular, the mixture may be DC 1-2577. More particularly, when the hydrophobic polymer is a siloxane compound and/or silane compound as defined above the metal-organic framework may be HKUST-1 or Cu-MOF-74.

In particular, the hydrophobic compound, more particularly the silane compound and/or the siloxane compound, may be provided as a mixture comprising a solvent, for example an organic solvent. More particularly, the solvent may comprise methanol, acetone, isopropanol, hexane, heptane, toluene, cyclohexane, benzene, ethyl acetate, diethyl ether, ethanol, dimethyl sulfoxide, acetic acid, formic acid, propionic acid, water or mixtures thereof. In particular, the organic solvent may comprise methanol, ethanol, acetone, isopropanol, hexane, heptane, water or mixtures thereof. More particularly, the organic solvent may comprise methanol, acetone, isopropanol or mixtures thereof. In particular, the organic solvent may comprise acetone.

According to a second aspect, this invention relates to MOFs formed by the process of the invention, as well as to shaped bodies comprising a MOF formed by the process of the invention. The shaped body can have any suitable form and can be, for example, a pellet, monolith or rod-like extrudate. However, the shape of the body is not particularly limited, and can be tailored for instance to the intended commercial application. In particular, the shaped body may be a pellet. More particularly, the pellet may have a diameter of 0.5-5 mm. In some embodiments, the shaped body may additionally comprise a binder. In the context of the present invention, the term "shaped body" may refer to any solid body that extends to at least 0.2 mm in at least one direction in space. The body may take any conceivable shape and may extend in any direction by any length so long as it preferably extends to at least 0.2 mm in one direction. More particularly, the shaped bodies may not extend to more than 50 mm and not to less than 0.2 mm in any direction. In particular, this range may be limited to from 1 mm to 16 mm, more particularly from 1 mm to 5 mm.

In particular, the MOF formed by the process of the invention may be such that when exposed to 100% relative humidity (RH) at 50° C. for 14 days, it may have a BET surface area which is at least 10% of that of the fresh MOF. In the context of the invention, the word "fresh" is used to refer to a freshly prepared MOF, or one that has been stored/kept at room temperature under dried (ie reduced humidity) conditions. More particularly, when exposed to 100% relative humidity (RH) at 50° C. for 14 days, the MOF may have a BET surface area which is at least 20% of that of the fresh MOF, even more particularly at least 30%, more particularly at least 40%.

According to a third aspect, this invention relates to the use of a hydrophobic polymer, a silane compound and/or a siloxane compound to improve the water stability of a metal-organic framework. More particularly, the improvement to water stability may be by increasing the hydrophobicity of the metal-organic framework.

The hydrophobic polymer, silane compound and/or siloxane compound may be as defined above.

Figure 2:
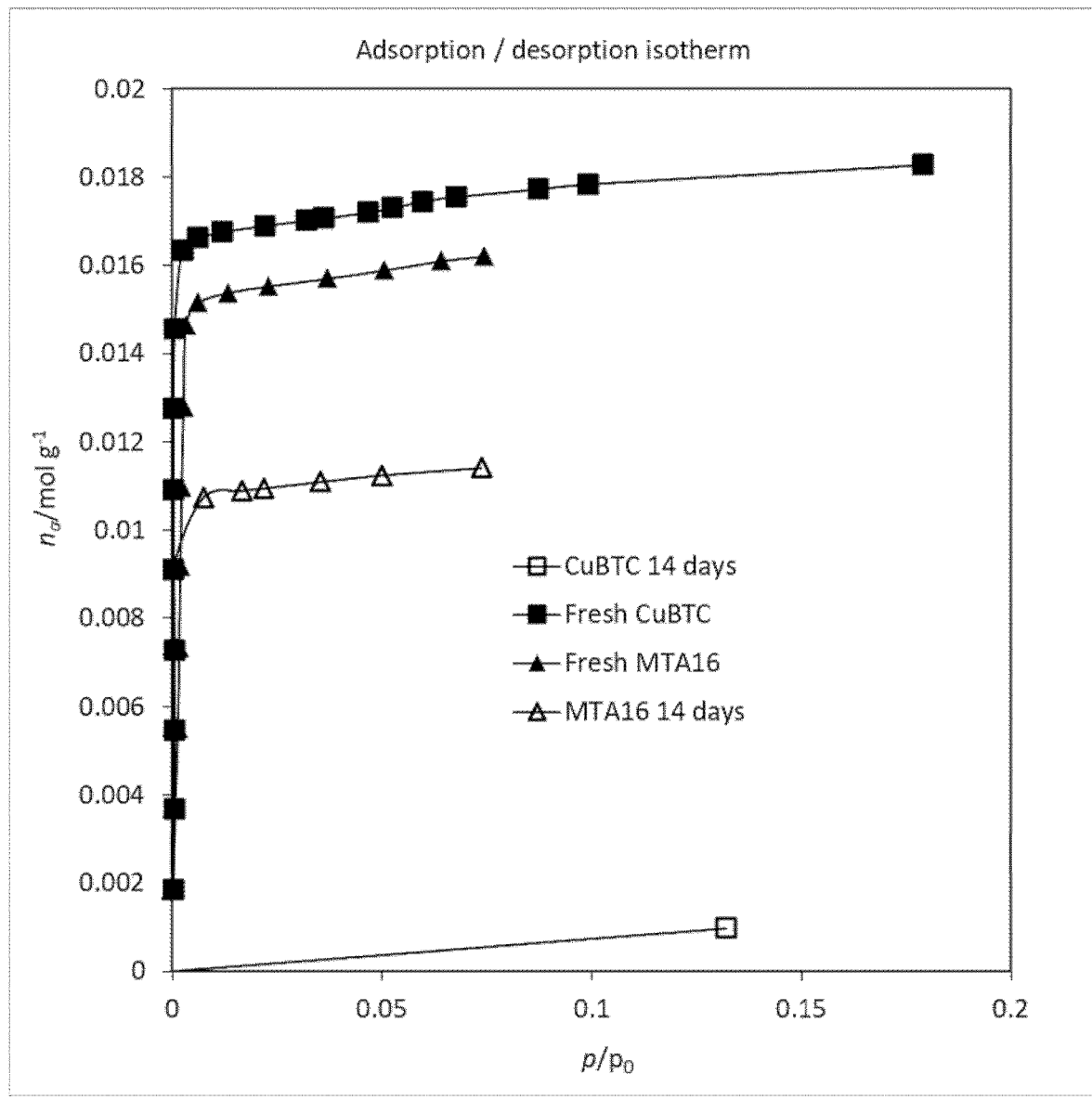
Figure 3:
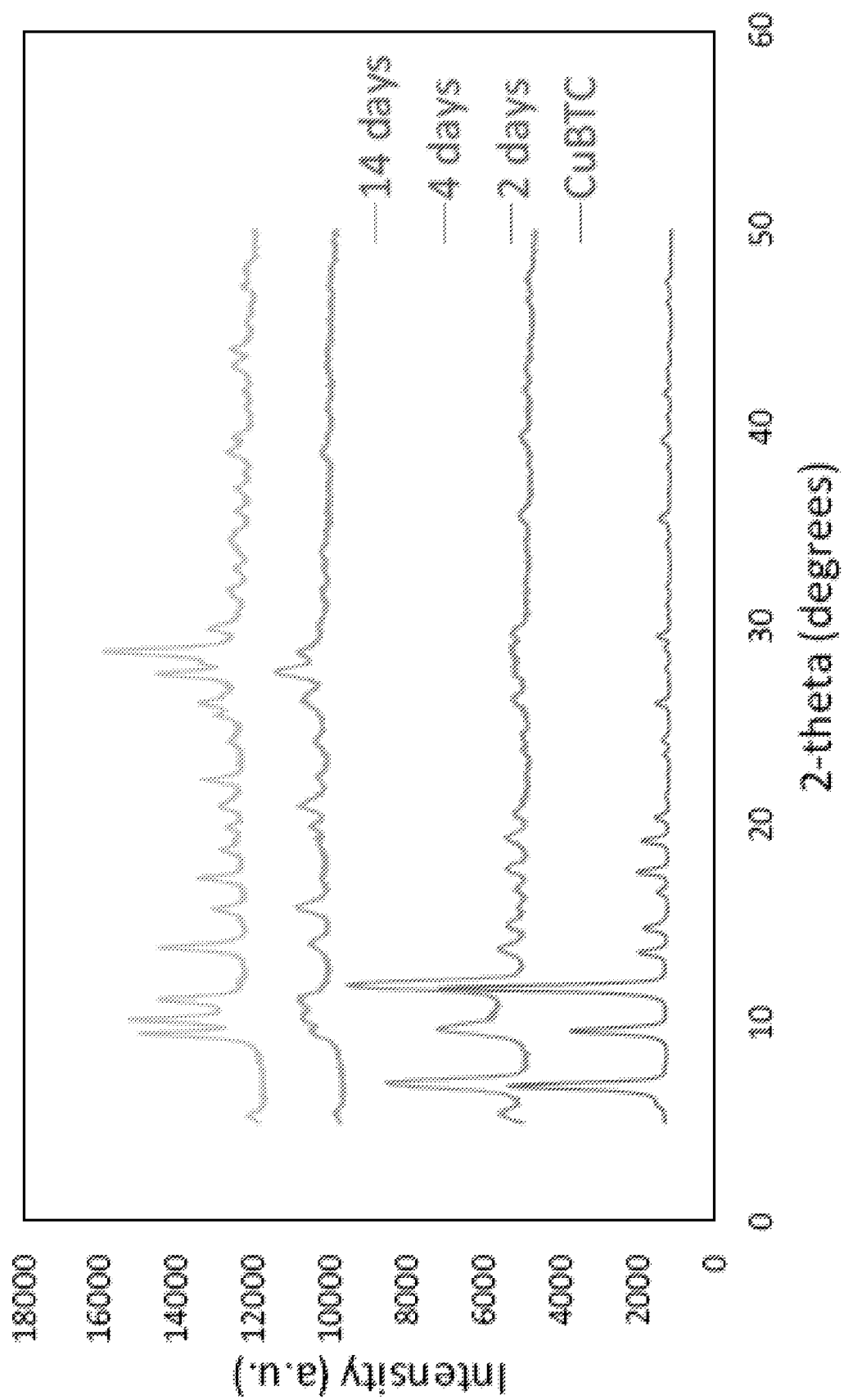
Figure 4:
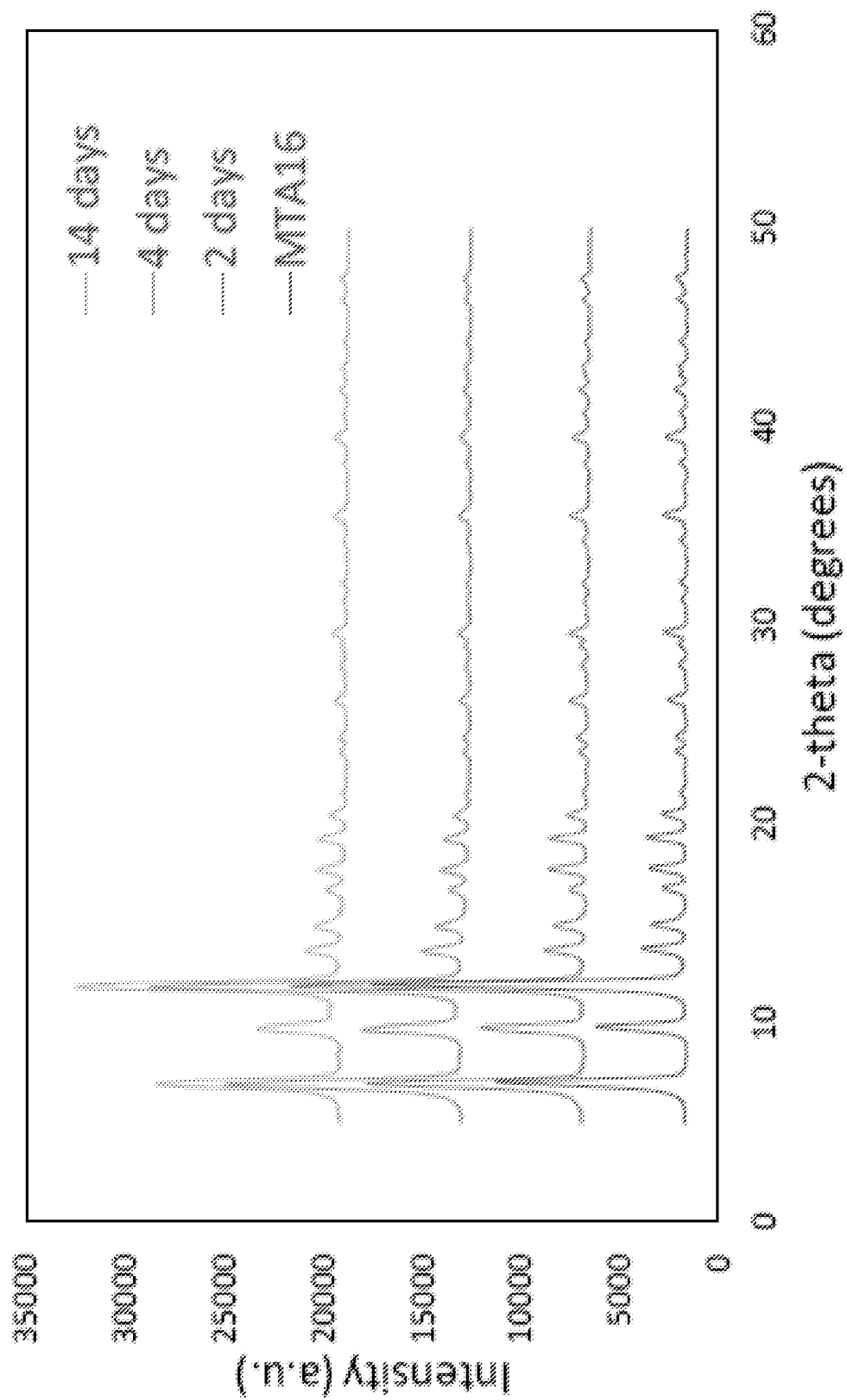
Figure 5:
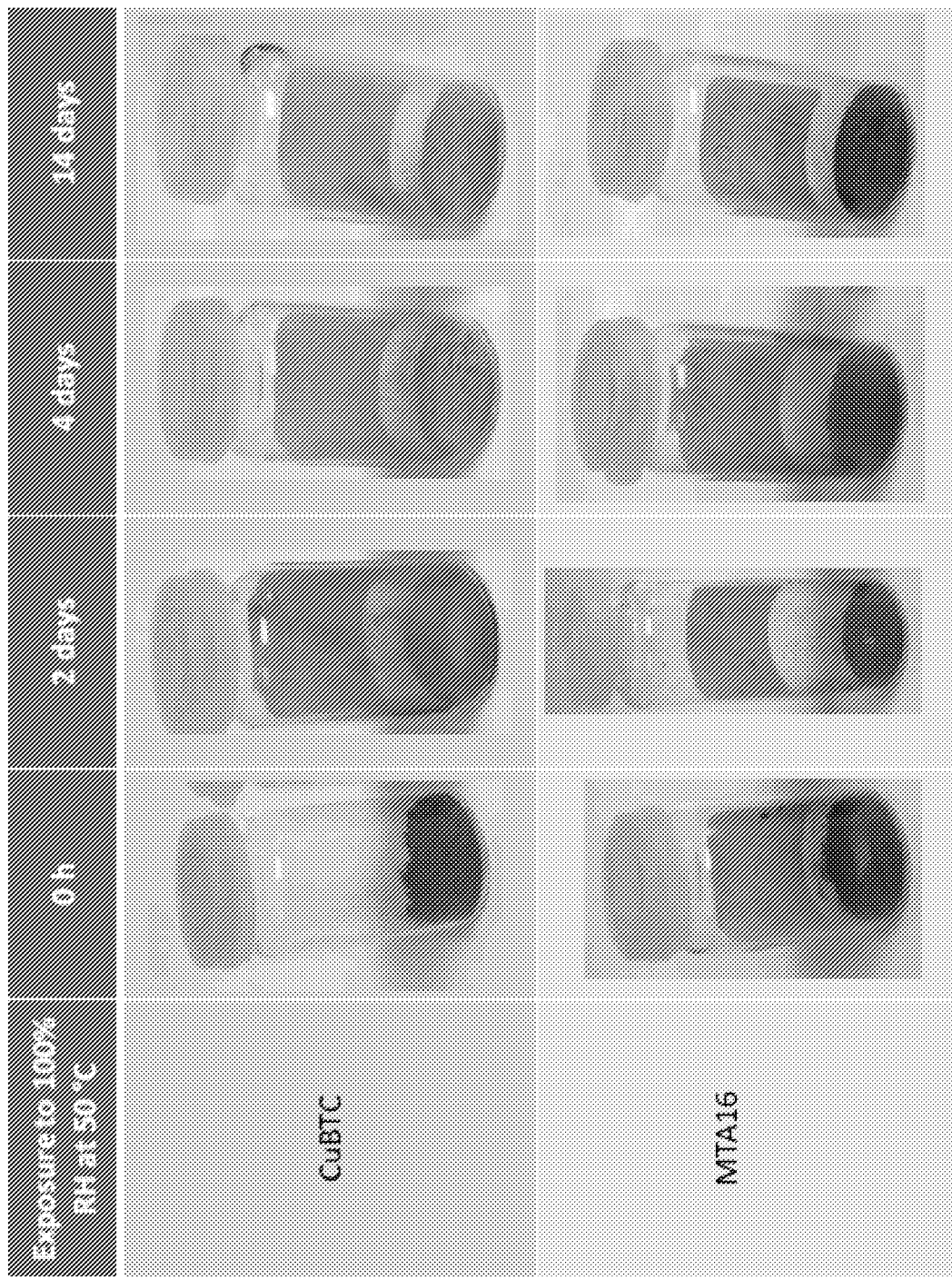
Figure 6:
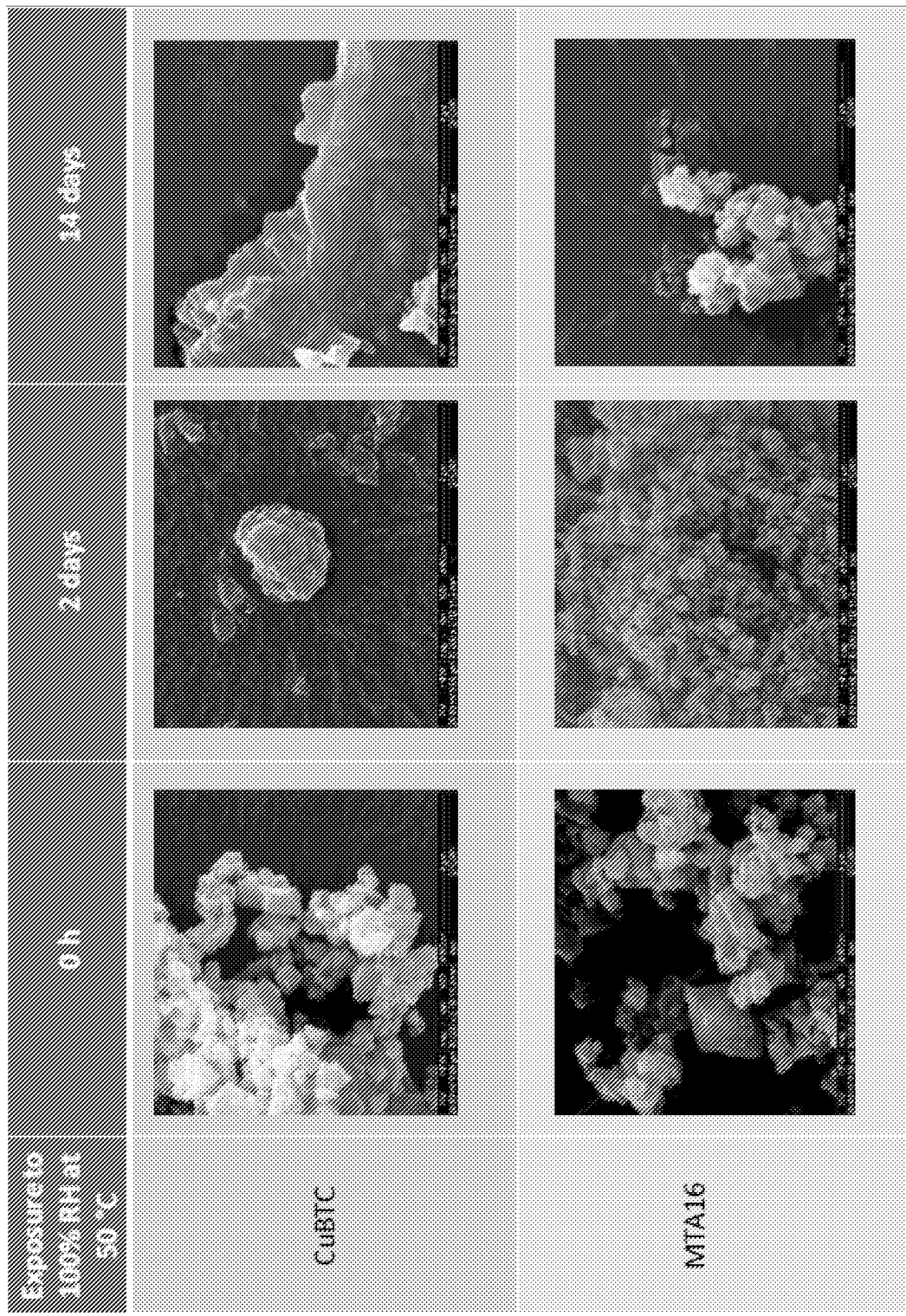
Figure 7:
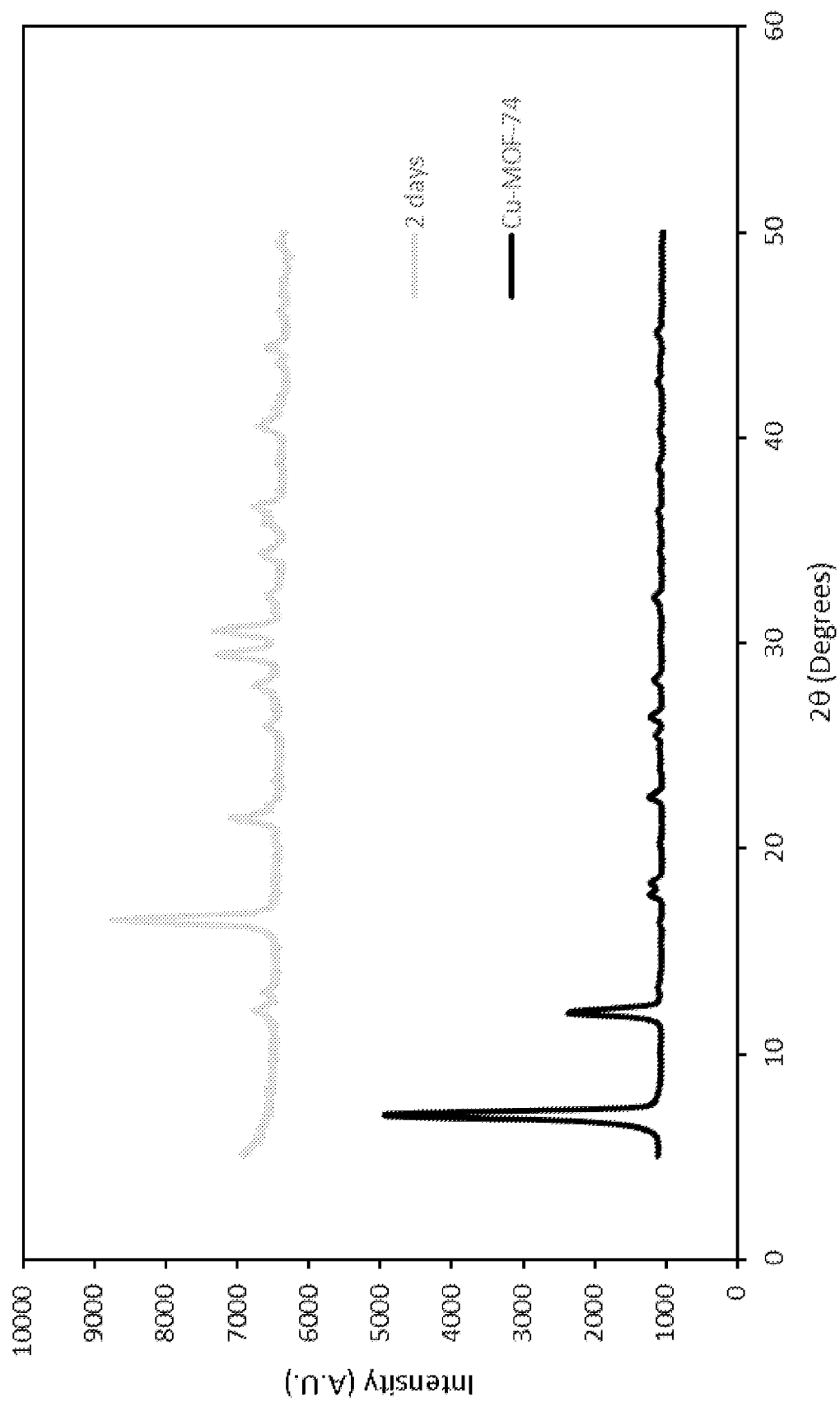
Figure 8:
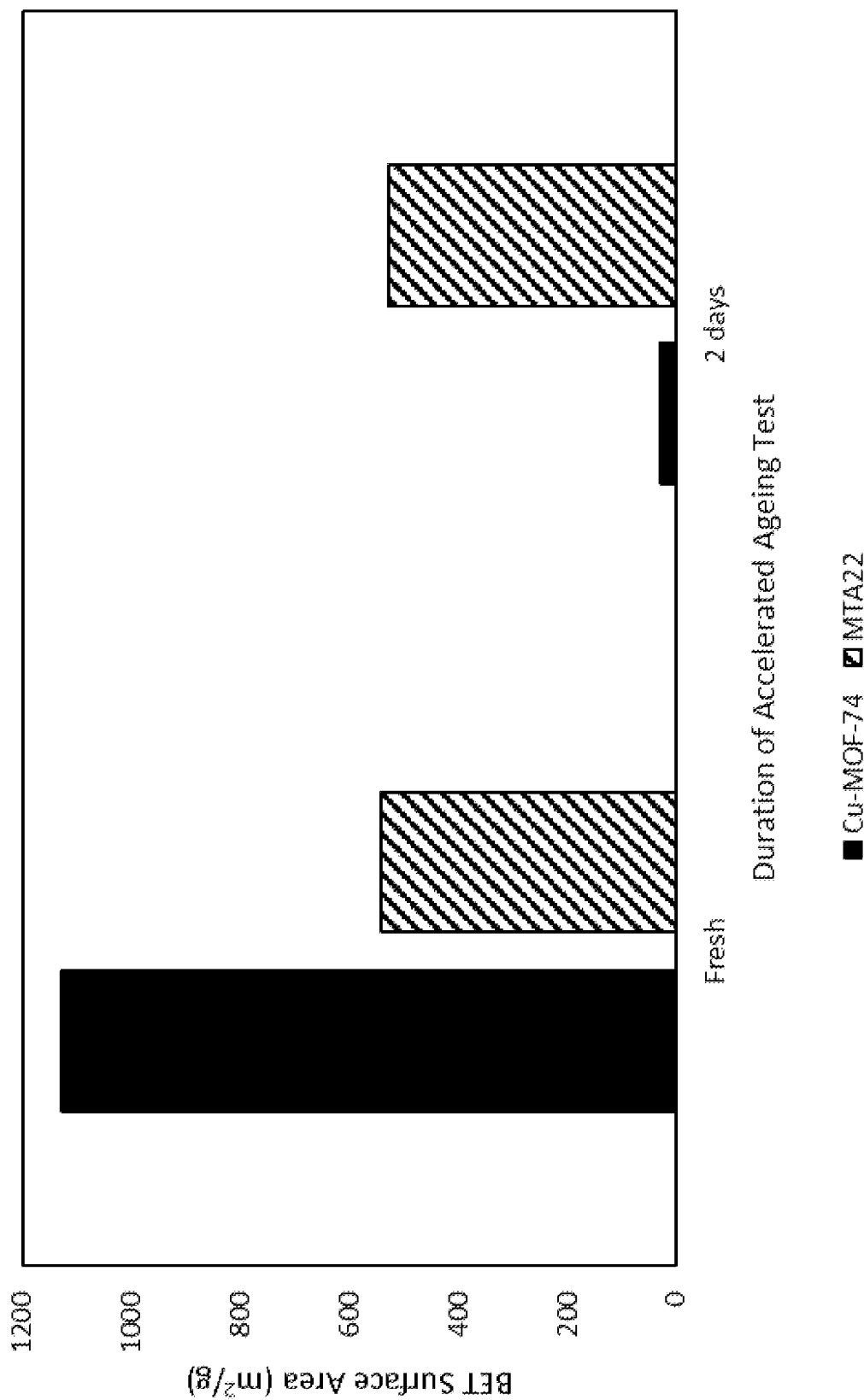
Figure 9:
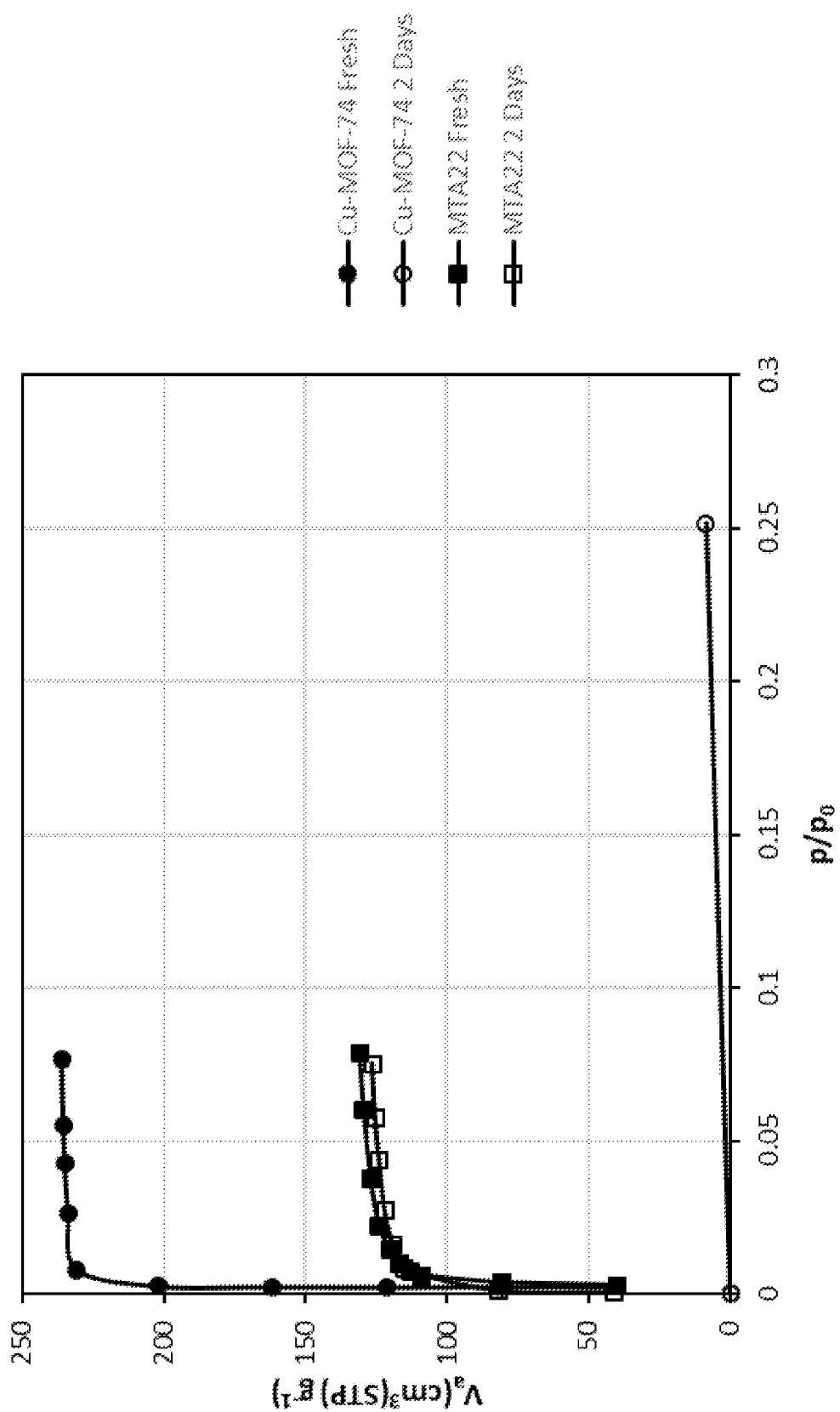
Figure 10:
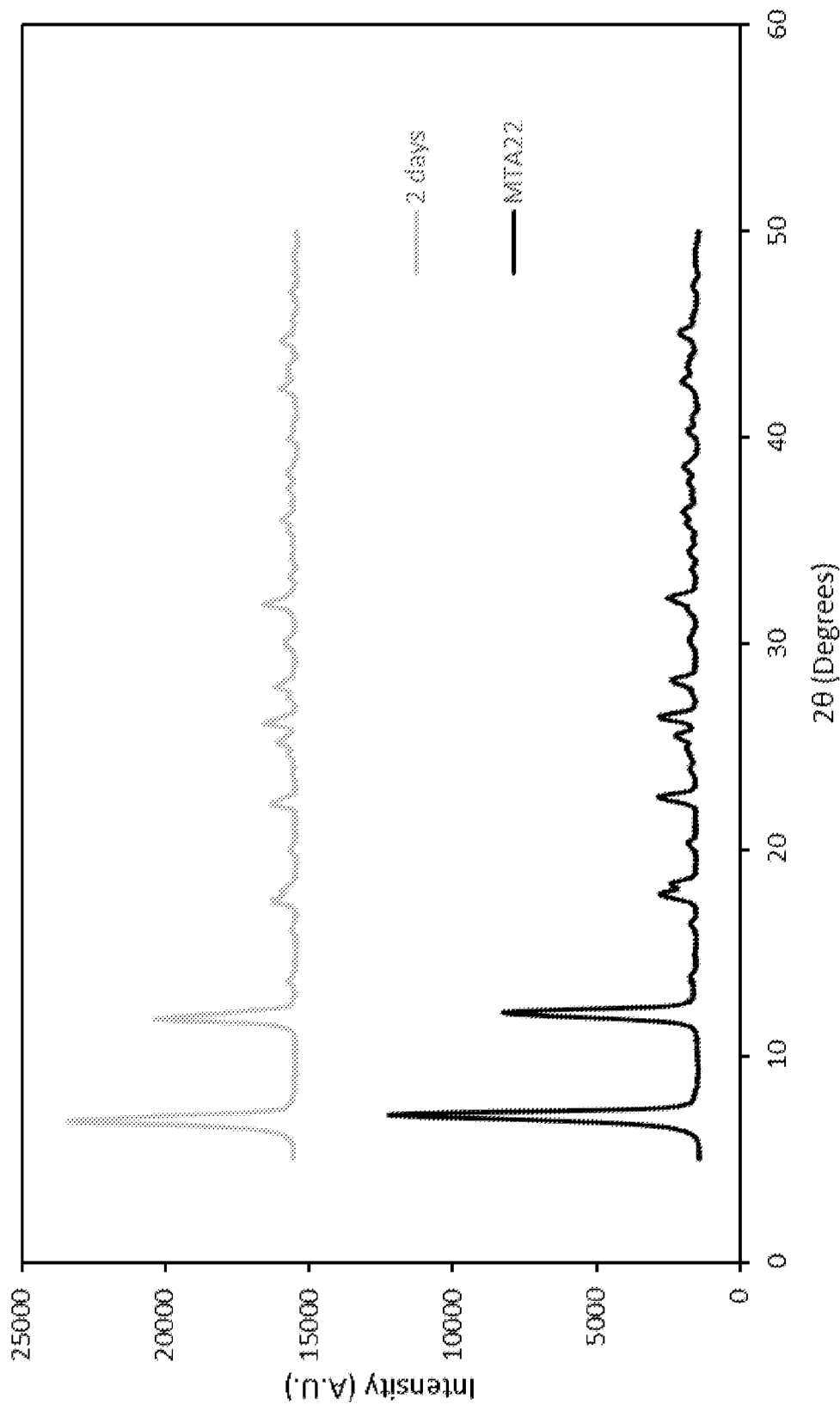
Figure 11:
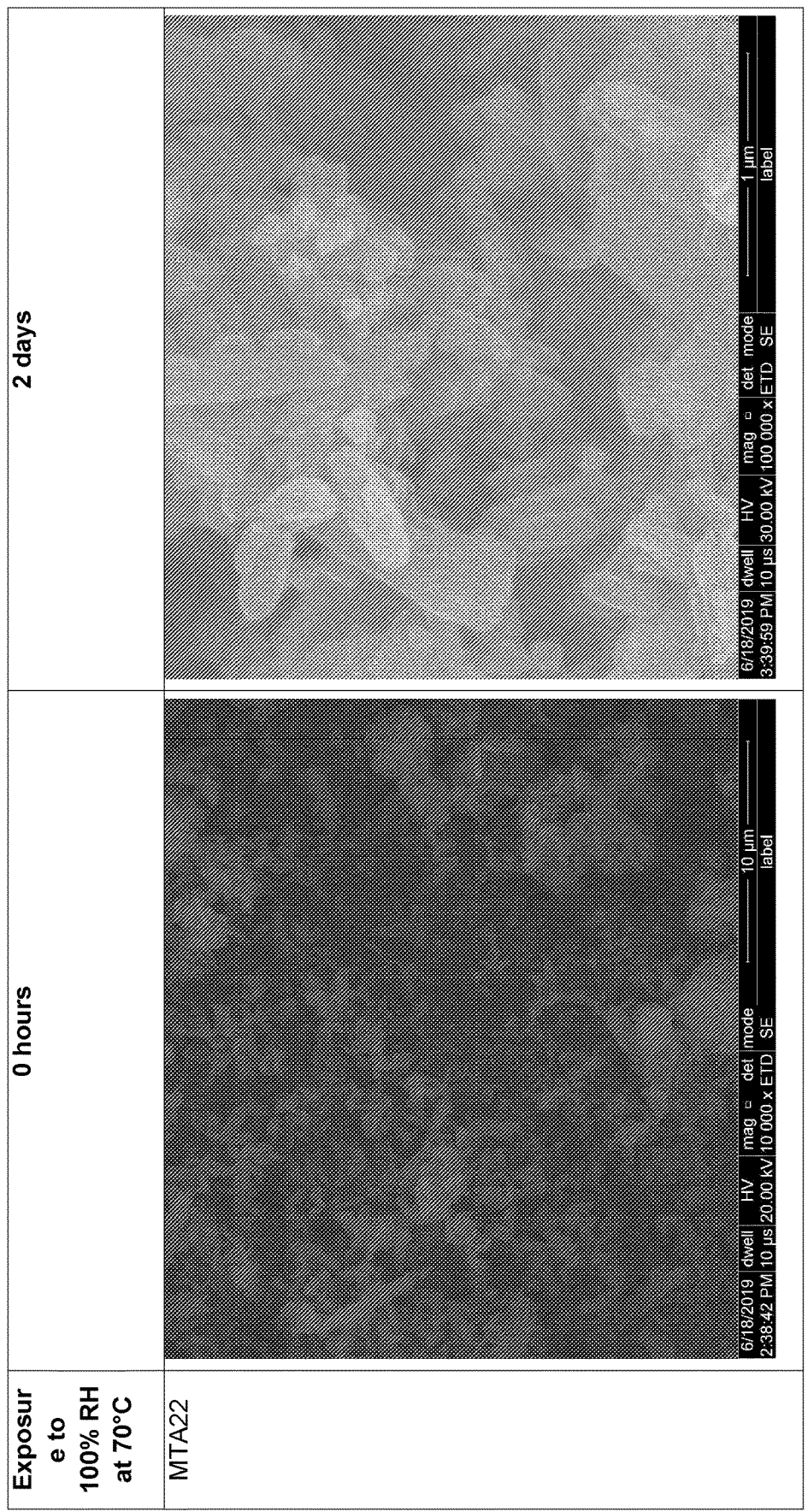
Figure 12:
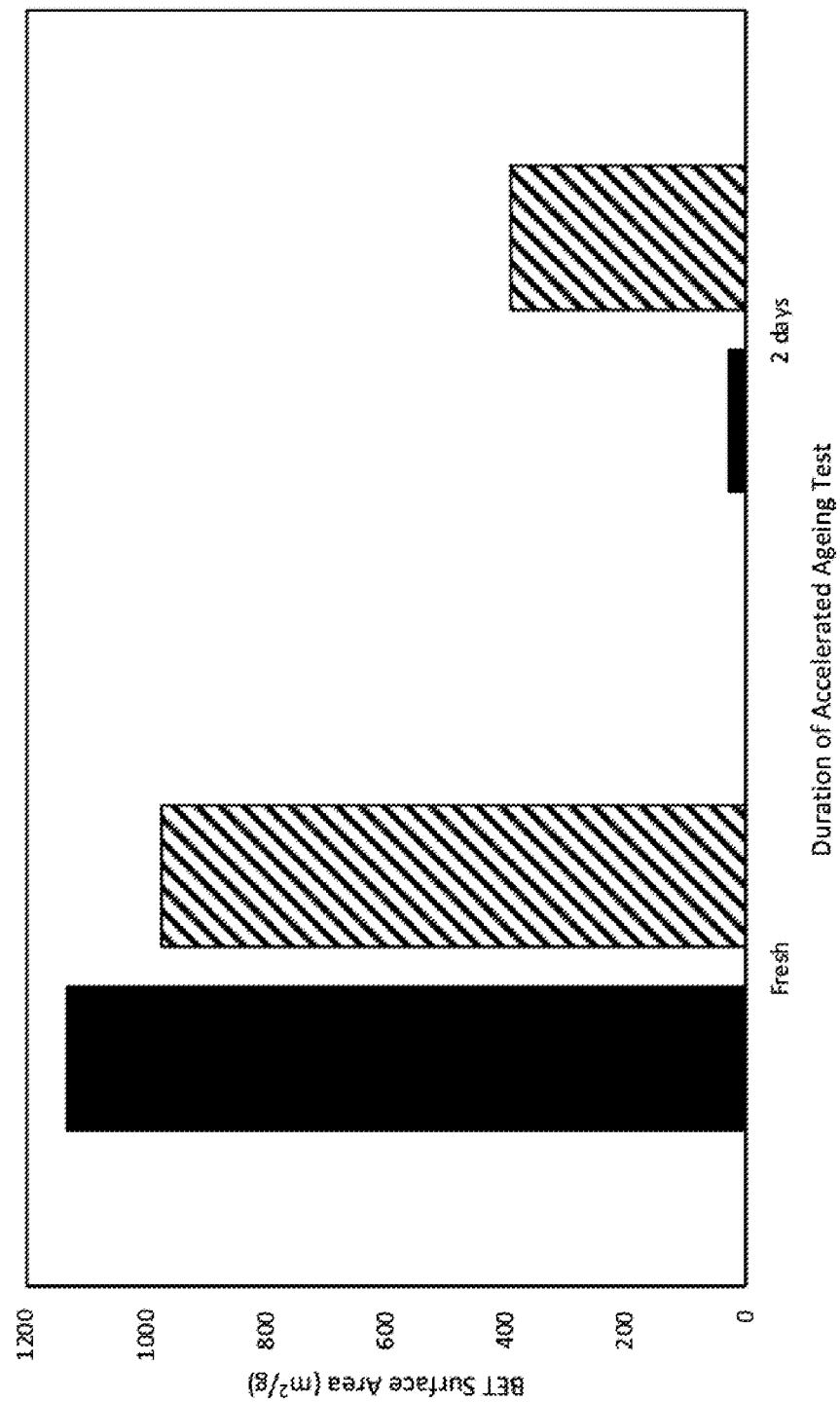
Figure 13:
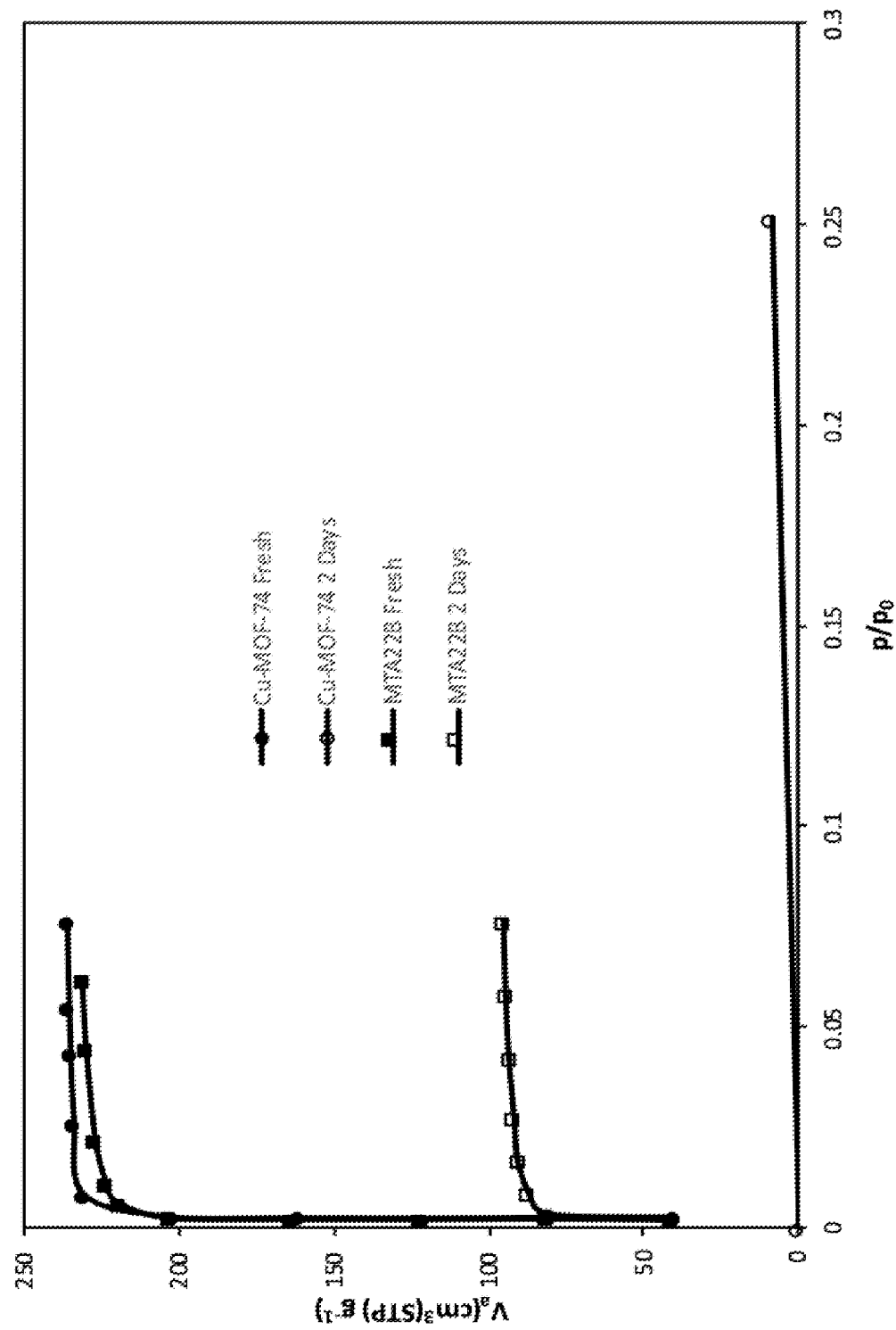
Figure 14:
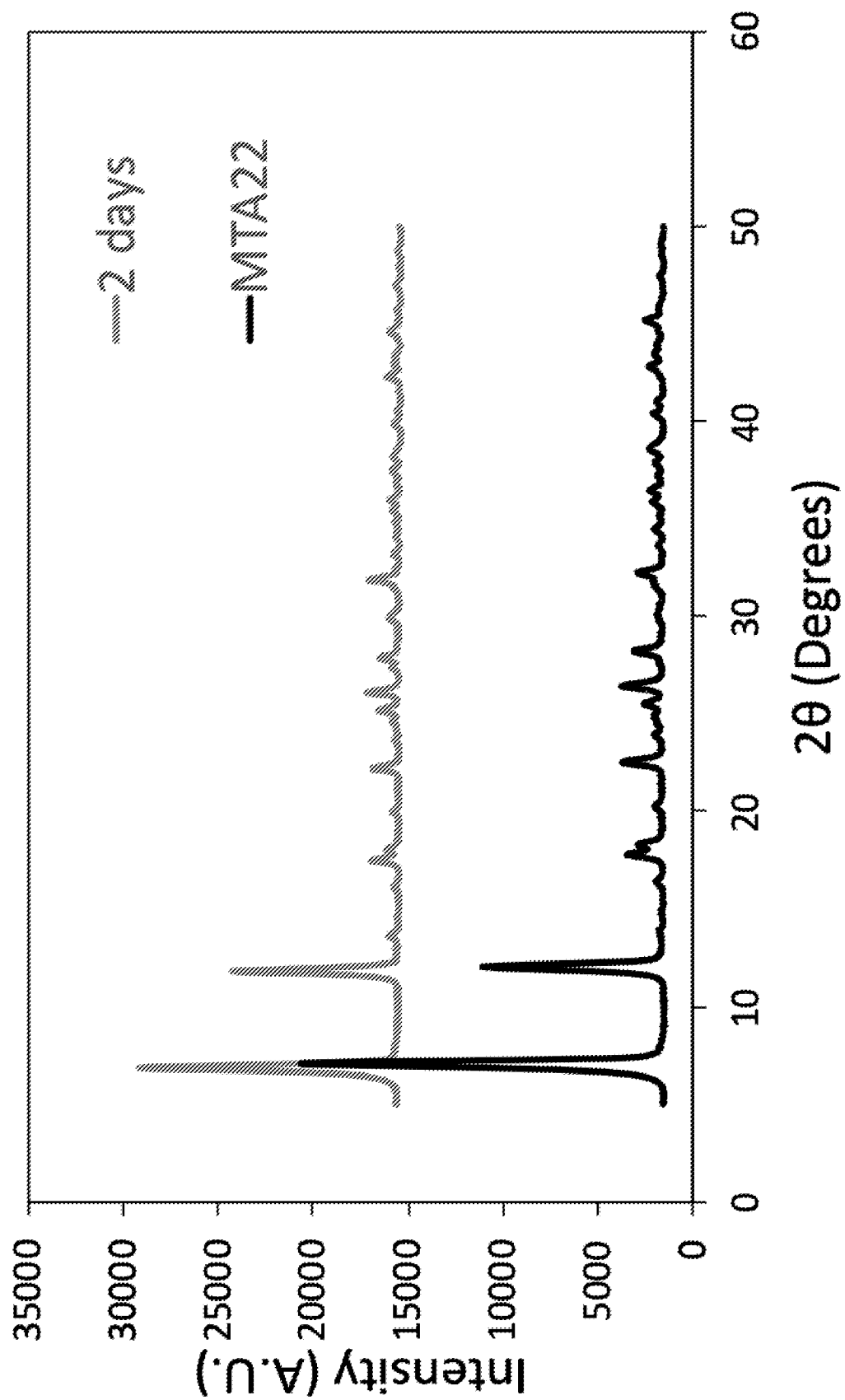
Figure 15:
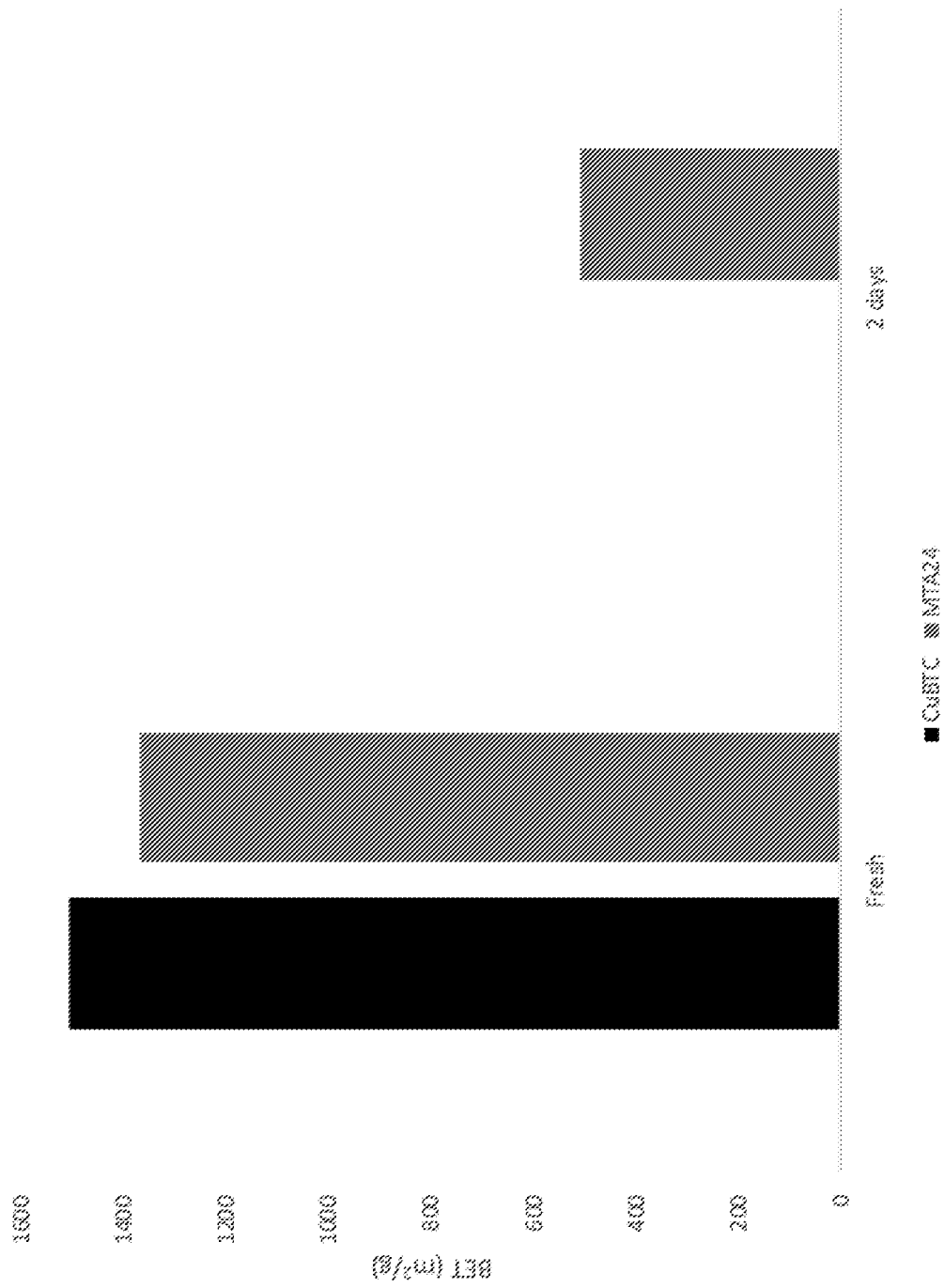
Figure 16:
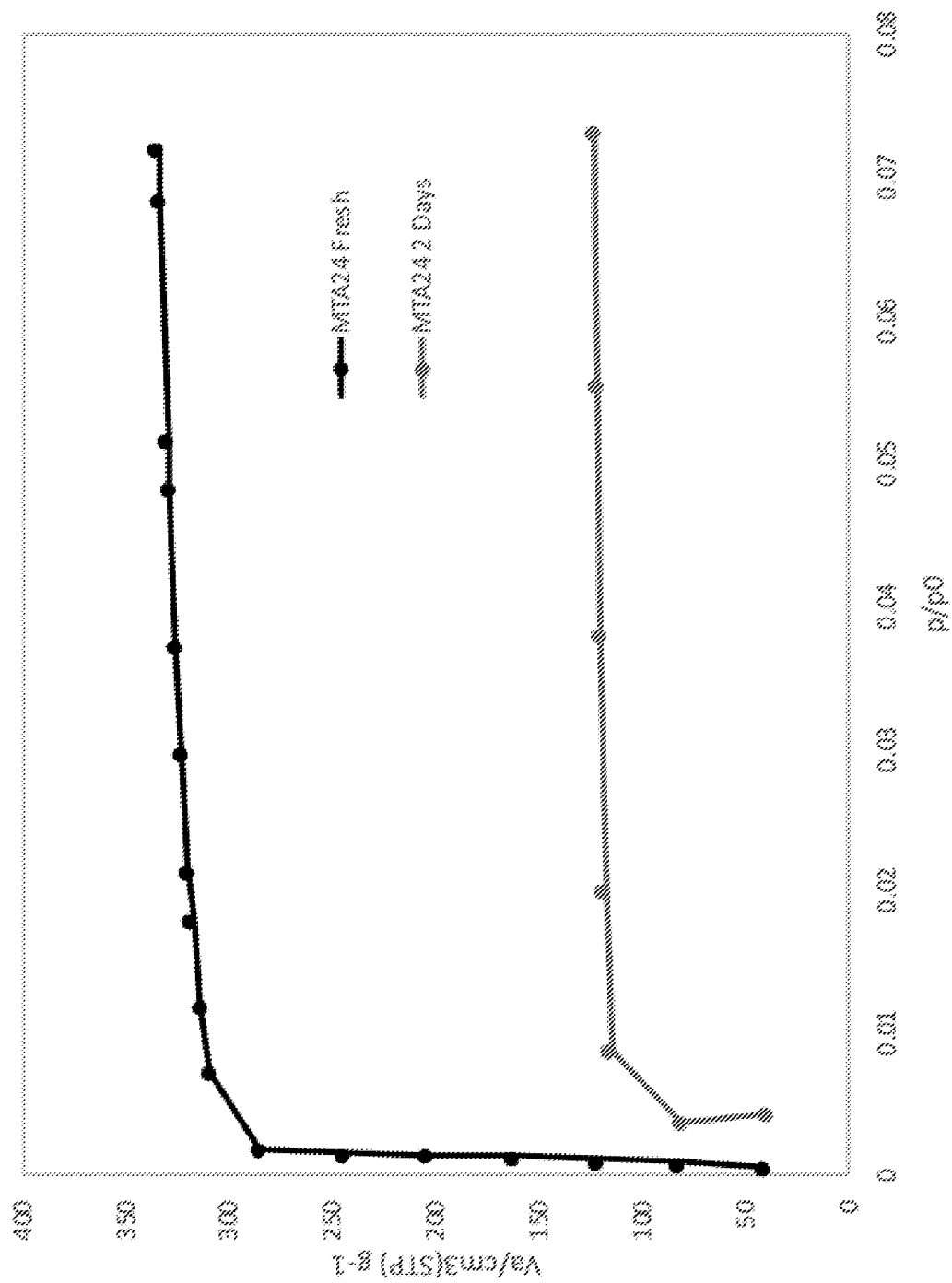
Figure 17:
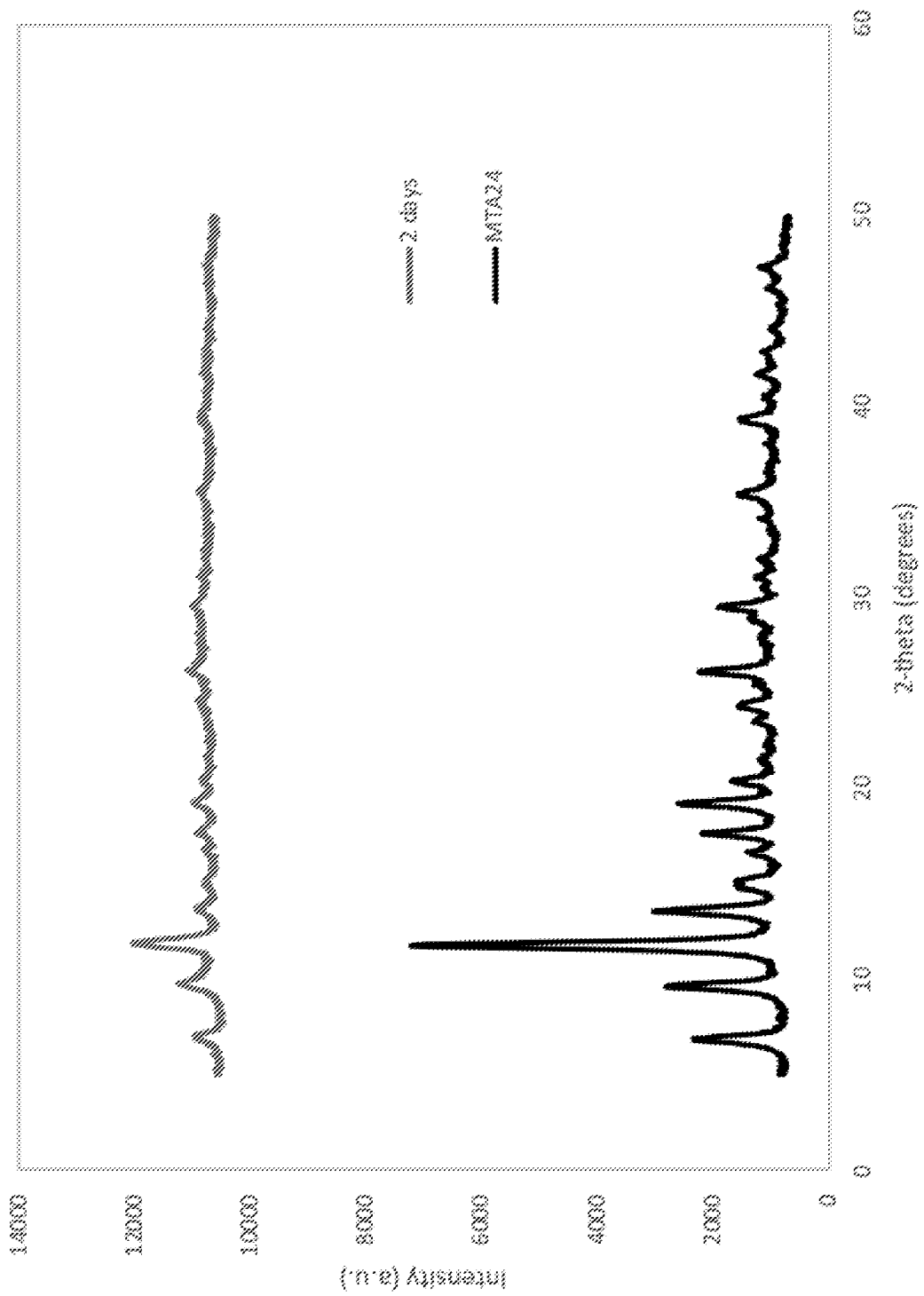

This invention will be further described by reference to the following Figures which are not intended to limit the scope of the invention claimed, in which:

FIG. 1 shows a bar chart comparing the hydrothermal stability of CuBTC and the material of Example 1, FIG. 2 shows $N_2$ isotherms at 77K for CuBTC and the material of Example 1 exposed to humid conditions, FIG. 3 shows XRD data for CuBTC exposed to humid conditions, FIG. 4 shows XRD data for the material of Example 1 exposed to humid conditions, FIG. 5 shows the colour change demonstrated by CuBTC and the material of Example 1 exposed to humid conditions, FIG. 6 shows SEM images of CuBTC and the material of Example 1 exposed to humid conditions, FIG. 7 shows XRD data for Cu-MOF-74 exposed to humid conditions, FIG. 8 shows a bar chart comparing the hydrothermal stability of Cu-MOF-74 and the material of Example 6, FIG. 9 shows $N_2$ isotherms at 77K for Cu-MOF-74 and the material of Example 6, FIG. 10 shows XRD data for the material of Example 6 exposed to humid conditions, FIG. 11 shows SEM images the material of Example 6 exposed to humid conditions, which demonstrates that there is no significant degradation, FIG. 12 shows a bar chart comparing the hydrothermal stability of Cu-MOF-74 and the material of Example 8, FIG. 13 shows $N_2$ isotherms at 77K for Cu-MOF-74 and the material of Example 8, FIG. 14 shows XRD data for the material of Example 8 exposed to humid conditions, FIG. 15 shows a bar chart comparing the hydrothermal stability of CuBTC and the material of Example 14, FIG. 16 shows $N_2$ isotherms at 77K for CuBTC and the material of Example 14, and FIG. 17 shows XRD data for the material of Example 14 exposed to humid conditions.

EXAMPLES

Example 1: Processing CuBTC (Powder) with Siloxanes/Silanes

A copper-trimesate MOF was processed in a twin screw extruder (Thermofisher Process 11), as follows.

Commercially available CuBTC was fed into the extruder using a volumetric feeder at a rate of 0.6 g/min. A solution containing a mixture of siloxanes/silanes (2.5 g of DC 1-2577) in 100 ml acetone was fed into the extruder at 1.9 mL/min. The mixture was processed through the barrel at 55 rpm. The temperature of the barrel was 25° C. The extrudate was collected and dried overnight under vacuum at room temperature. The BET surface area of the product was determined to be 1484 $m^2$/g.

Example 2: Hydrothermal Stability Studies of CuBTC (Powder) with Siloxanes/Silanes Commercially available CuBTC was exposed to 100% relative humidity at 50° C. for 14 days. The BET surface area of this material decreased from 1621 $m^2/g$ to 549 $m^2/g$ after 2 days, ie a drop of approximately 66%, and to 82 $m^2/g$ after 14 days, ie a total drop of approximately 95%.

Material prepared according to Example 1 above, ie siloxane/silane treated CuBTC, was also exposed to 100% relative humidity at 50° C. for 14 days. The BET surface area of this material also decreased. However, the decrease for this material was much less, from 1484 $m^2/g$ to 1445 $m^2/g$ after 2 days, ie a drop of approximately 3%, and to 1054 $m^2/g$ after 14 days. This is a total drop of only around 29%.

These results are shown in Table 1 below, and as a bar chart in FIG. 1.

TABLE 1

| Material exposed to 100% RH at 50° C. | 0 h | 2 days | 14 days |
|---|---|---|---|
| CuBTC* | 1621 $m^2/g$ | 549 $m^2/g$ | 82 $m^2/g$ |
| siloxanes/silane treated CuBTC (MTA16) | 1484 $m^2/g$ | 1445 $m^2/g$ | 1054 $m^2/g$ |

*comparative example $N_2$ adsorption/desorption isotherms were also measured for CuBTC and siloxane/silane treated CuBTC both before humidity exposure and after exposure to 100% relative humidity at 50° C. for 14 days. The equipment used was a Belsorp Mini II, the $N_2$ adsorption isotherms being recorded at 77 K. The results are shown in FIG. 2 (CuBTC=squares, siloxane/silane treated CuBTC=triangles; filled=before, empty=after). Whilst both materials exhibit a decline in $N_2$ adsorption, the reduction is much more significant for CuBTC than it is for siloxanes/silane treated CuBTC.

Powder X-ray diffraction data was also collected for CuBTC and siloxanes/silane treated CuBTC. The equipment used was a Panalytical Aeris. Measurements were made before humidity exposure, as well as after 2, 4 and 14 days of exposure to 100% relative humidity at 50° C. This data is shown in FIGS. 3 (CuBTC) and 4 (siloxane/silane treated CuBTC).

The deterioration of the CuBTC sample is clearly shown by the change in the XRD trace from the before exposure sample (bottom trace) up through the increasing exposure times (2, 4, and then the top trace for 14 days). In contrast, siloxane/silane treated CuBTC sample shows very little difference between the before exposure sample (bottom trace) and that after 14 days exposure to humidity (top trace).

Further evidence of the deterioration of the CuBTC sample is shown by its change in colour from before its exposure to humidity, through to exposure to 100% relative humidity at 50° C. after 2, 4 and 14 days. This is shown in FIG. 5, in which the top sample is CuBTC and the bottom sample is siloxane/silane treated CuBTC. The colour of the CuBTC sample clearly fades as the duration of humidity exposure increases, whereas the colour of the siloxane/silane treated CuBTC sample remains substantially the same.

FIG. 6 shows SEM images of CuBTC (top row) and siloxane/silane treated CuBTC (bottom row) before humidity exposure and after 2 and 14 days of exposure to 100% relative humidity at 50° C. These images demonstrate a substantial change in the morphology of CuBTC particles upon exposure to humidity, which is in agreement with the structure deterioration determined by XRD and BET analysis. In contrast, the siloxane/silane treated CuBTC particles showed very little change after exposure to humidity for 14 days.

Example 3: Preparing and Processing CuBTC (Powder) with Siloxane/Silanes

In the third example, a copper-trimesate MOF was synthesised and processed in the extruder (Thermofisher Process 11), as follows.

A mixture of copper (II) hydroxide and trimesic acid (in stoichiometric ratio) was fed into the extruder using a volumetric feeder at a rate of 0.6 g/min. A solution containing a mixture of siloxanes/silanes (2.5 g of DC 1-2577) in 100 ml of acetone/methanol (50:50) was fed into the extruder at 1.9 mL/min. The mixture was processed through the barrel at 55 rpm. The temperature of the barrel was 25° C. The extrudate was collected and dried overnight under vacuum at room temperature. The BET surface area of the product was determined to be 1255 $m^2/g$.

Example 4: Processed CuBTC in Shaped Form (Extrudates) with Siloxanes/Silanes In the fourth example, a copper-trimesate MOF was prepared and processed in the extruder (Thermofisher Process 11) in shaped form, as follows.

A mixture of copper (II) hydroxide and trimesic acid (in stoichiometric ratio) was fed into the extruder using a volumetric feeder at a rate of 1.6 g/min. A solution containing a mixture of siloxanes/silanes (6.35 g of DC 1-2577) in 100 ml of acetone/methanol (50:50) was fed into the extruder at 1.9 mL/min. The mixture was processed through the barrel at 55 rpm. The temperature of the barrel was 25° C. At the end of the barrel a 2 mm die was connected. The extrudate was collected in pellet form (2 mm diameter) and dried overnight under vacuum at room temperature. The BET surface area of the product was determined to be 1642 $m^2/g$.

Example 5: Hydrothermal Stability Studies of CuBTC in Shaped Form (Extrudates) with Siloxanes/Silanes Commercially available 2 mm CuBTC pellets were exposed to 100% relative humidity at 50° C. for 14 days. The BET surface area of this material decreased from 1559 $m^2/g$ to 53 $m^2/g$, ie a drop of approximately 97%.

Material prepared according to Example 4 was also exposed to 100% relative humidity at 50° C. for 14 days. The BET surface area of this material also decreased. However, the decrease for this material was much less, from 1642 $m^2/g$ to 837 $m^2/g$. This is a drop of only around 51%. A similar result was obtained when drying at 150° C. (as was the case for all of the examples).

Example 6: Processing Cu-MOF-74 (Powder by Extrusion) with Siloxanes/Silanes In the sixth example, a commercially available copper-2, 5-dihydroxiterephthalate MOF (ie Cu-MOF-74) was processed in a twin screw extruder (Thermofisher Process 11), as follows.

Cu-MOF-74 was fed into the extruder using a volumetric feeder at a rate of 0.25 g/min. A solution containing 2.43 g of silane/siloxane mixture (ie DC 1-2577) in 100 mL acetone was fed into the extruder at 0.7 mL/min. The mixture was processed through the barrel at 55 rpm. The temperature of the barrel was 30° C. The extrudate was collected and dried overnight under vacuum at room temperature. The BET surface area of the product was determined to be 541 $m^2/g$.

Example 7: Processing Cu-MOF-74 (Powder by Sonication) with Siloxanes/Silanes

In the seventh example, a commercially available copper-2,5-dihydroxiterephthalate MOF was processed in an ultrasound bath, as follows.

1 g of Cu-MOF-74 was added into a 10 mL acetone solution containing 0.10 g of silane/siloxane (ie DC 1-2577). The mixture was processed at 30° C. for 60 minutes. The solid was recovered from the solution and dried overnight under vacuum at room temperature. The BET surface area of the product was determined to be 794 $m^2/g$.

Example 8 Preparing and Processing Cu-MOF-74 (Powder by Solution) with Siloxane/Silanes In the eighth example, a copper-2,5-dihydroxyterephthalate MOF was processed in solution, as follows.

1.03 g of the commercially available copper-trimesate MOF was added to a 10 mL acetone solution containing 0.30 g of silicones/silane (DC-1-2577). The mixture was processed at 70° C. (ie at reflux) for 60 minutes. The solid was recovered from the solution and dried overnight under vacuum at room temperature. The BET surface area of the product was determined to be 972 $m^2/g$.

Example 9: Hydrothermal Stability Studies of Cu-MOF-74 (Powder by Extrusion, Sonication and Solution) with Siloxanes/Silanes Commercially available Cu-MOF-74 was exposed to 100% relative humidity at 70° C. for 2 days. The BET surface area decreased from 1129 $m^2/g$ to 28 $m^2/g$.

Material prepared according to Example 6 was also exposed to 100% relative humidity at 70° C. for 2 days. The BET surface area decreased from 541 $m^2/g$ to 526 $m^2/g$. This data is shown in FIG. 8.

Material prepared according to Example 7 was also exposed to 100% relative humidity at 70° C. for 2 days. The BET surface area decreased from 794 $m^2/g$ to 758 $m^2/g$.

Material prepared according to Example 8 was also exposed to 100% relative humidity at 70° C. for 2 days. The BET surface area of this material also decreased. However, the decrease for this material was much less, from 972 $m^2/g$ to 389 $m^2/g$.

Again, this showed that the decrease in BET surface area was much less for the inventive materials of Examples 6, 7 and 8 than it was for Cu-MOF-74.

$N_2$ adsorption/desorption isotherms were also measured for Cu-MOF-74 and the material of Examples 6 and 8 both before humidity exposure and after exposure to 100% relative humidity at 70° C. for 2 days. The equipment used was a Belsorp Mini II, the $N_2$ adsorption isotherms being recorded at 77 K. The results are shown in FIG. 9 (Example 6) and FIG. 13 (Example 8). This shows that Cu-MOF-74 experiences a significant decline in $N_2$ adsorption, whilst the material of Examples 6 and 8 had only slightly lower adsorption.

Powder X-ray diffraction data was also collected for Cu-MOF-74, and the materials of Examples 6 and 8. The equipment used was a Panalytical Aeris. Measurements were made before humidity exposure, as well as after 2 days of exposure to 100% relative humidity at 70° C. This data is shown in FIGS. 7 (Cu-MOF-74), 10 (Example 6) and 14 (Example 8).

The deterioration of the Cu-MOF-74 sample is clearly shown by the change in the XRD trace from the before exposure sample (bottom trace) to the 2 day sample (top trace). In contrast, material of Examples 6 and 8 shows very little difference between the before exposure sample (bottom trace) and that after 2 days' exposure to humidity (top trace).

Example 10: Preparing and Processing CuBTC in Shaped Form (Extrudates) with Octamethyltrisiloxane In the tenth example, a copper-trimesate MOF was prepared and processed in the extruder (Thermofisher Process 11) in shaped form, as follows.

A mixture of copper (II) hydroxide and trimesic acid (in stoichiometric ratio) was fed into the extruder using a volumetric feeder at a rate of 1.12 g/min. A solution containing a mixture of 18.37 g octamethyltrisiloxane in 100 ml acetone/methanol (85:15) was fed into the extruder at 1.93 mL/min. The mixture was processed through the barrel at 55 rpm. The temperature of the barrel was 25° C. At the end of the barrel a 2 mm die was connected. The extrudate was collected in pellet form (2 mm diameter) and dried overnight under vacuum at room temperature. The BET surface area of the product was determined to be 1056 $m^2/g$.

Example 11: Preparing and Processing CuBTC in Shaped Form (Extrudates) with Trimethoxyl(Methyl)Silane In the eleventh example, a copper-trimesate MOF was prepared and processed in the extruder (Thermofisher Process 11) in shaped form, as follows.

A mixture of copper (II) hydroxide and trimesic acid (in stoichiometric ratio) was fed into the extruder using a volumetric feeder at a rate of 1.15 g/min. A 100 mL solution containing a mixture of 33.04 g of trimethoxyl(methyl) silane in acetone/methanol (85:15) was fed into the extruder at 2.32 mL/min. The mixture was processed through the barrel at 55 rpm. The temperature of the barrel was 25° C. At the end of the barrel a 2 mm die was connected. The extrudate was collected in pellet form (2 mm diameter) and dried overnight under vacuum at room temperature. The BET surface area of the product was determined to be 1400 $m^2/g$.

Example 12: Preparing and Processing CuBTC in Shaped Form (Extrudates) with Poly(Dimethylsiloxane)

In the twelfth example, a copper-trimesate MOF was prepared and processed in the extruder (Thermofisher Process 11) in shaped form, as follows.

A mixture of copper (II) hydroxide and trimesic acid (in stoichiometric ratio) was fed into the extruder using a volumetric feeder at a rate of 1.15 g/min. A solution containing a mixture of 16.52 g of poly(dimethylsiloxane) in 100 ml of acetone/methanol (85:15) was fed into the extruder at 2.316 mL/min. The mixture was processed through the barrel at 55 rpm. The temperature of the barrel was 25° C. At the end of the barrel a 2 mm die was connected. The extrudate was collected in pellet form (2 mm diameter) and dried overnight under vacuum at room temperature. The BET surface area of the product was determined to be 1113 m²/g.

Example 13: Hydrothermal Stability Studies CuBTC in Shaped Form (Extrudates) with Octamethyltrisiloxane, Trimethoxyl(Methyl)Silane or Poly(Dimethylsiloxane)

Commercially available 2 mm Cu-BTC pellets were exposed to 100% relative humidity at 50° C. for 2 days. The BET surface area decreased from 1508 m²/g to 2 m²/g.

Material prepared according to Example 10 was also exposed to 100% relative humidity at 50° C. for 2 days. The BET surface area decreased from 1111 m²/g to 717 m²/g.

Material prepared according to Example 11 was also exposed to 100% relative humidity at 50° C. for 2 days. The BET surface area decreased from 1400 m²/g to 972 m²/g.

Material prepared according to Example 12 was also exposed to 100% relative humidity at 50° C. for 2 days. The BET surface area decreased from 1113 m²/g to 384 m²/g.

This work showed that the decrease in BET surface area was much less for the inventive materials of Examples 10-12 than it was for Cu-BTC.

Example 14: Preparing and Processing CuBTC in Shaped Form (Extrudates) with Poly(Vinyl Pyrrolidone)

In the fourteenth example, a copper-trimesate MOF was synthesised and processed in the extruder (Thermofisher Process 11), as follows.

A mixture of copper (II) hydroxide and trimesic acid (in stoichiometric ratio) was fed into the extruder using a volumetric feeder at a rate of 1.37 g/min. A solution containing a mixture of PVP (10.09 g of PVP) in 100 ml of methanol was fed into the extruder at 1.9 mL/min. The mixture was processed through the barrel at 55 rpm. The temperature of the barrel was 25° C. The extrudate was collected and dried overnight under vacuum at room temperature. The BET surface area of the product was determined to be 1369 m²/g.

Example 15: Hydrothermal Stability Studies of CuBTC with PVP

Commercially available 2 mm CuBTC pellets were exposed to 100% relative humidity at 50° C. for 2 days. The BET surface area of this material decreased from 1508 m²/g to 2 m²/g.

Material prepared according to Example 14 was also exposed to 100% relative humidity at 50° C. for 2 days. The BET surface area of this material also decreased. However, the decrease for this material was much less, from 1369 m²/g to 507 m²/g.

The BET surface area data for the above Example 14 is shown in FIG. 15. A much more significant decrease is shown for CuBTC than for the material of Example 14.

$N_2$ adsorption/desorption isotherms were also measured for the material of Example 14 both before humidity exposure and after exposure to 100% relative humidity at 50° C. for 2 days. The equipment used was a Belsorp Mini II, the $N_2$ adsorption isotherms being recorded at 77 K. The results are shown in FIG. 16. This shows that the material of Example 16 had a lower, but still useful, adsorption.

Powder X-ray diffraction data was also collected for the material of Example 17. The equipment used was a Panalytical Aeris. Measurements were made before humidity exposure, as well as after 2 days of exposure to 100% relative humidity at 70° C. This data is shown in FIG. 17. The material of Example 14 shows very little difference between the before exposure sample (bottom trace) and that after 2 days' exposure to humidity (top trace), as all the main characteristic diffraction peaks are still present after the humidity exposure.

The invention claimed is:

1. A continuous process for the preparation of a metal-organic framework comprising a hydrophobic compound, the process comprising the steps of:
    (a) providing a first component comprising either (i) a metal-organic framework, or (ii) a first reactant which includes at least one metal in ionic form and a second reactant which includes at least one ligand capable of associating with the metal in ionic form in order to form a metal-organic framework,
    (b) providing a solution comprising a hydrophobic compound, wherein the solution comprises octamethyltrisiloxane, polydimethyl siloxane, methylmethoxy siloxane, phenylmethoxy siloxane, methyl silsesquioxane, phenyl silsesquioxane and trimethoxy(methyl) silane, and
    (c) mixing the first component and the hydrophobic compound in order to form the metal-organic framework comprising the hydrophobic compound.

2. A process as claimed in claim 1, wherein the metal-organic framework is selected from HKUST-1, ZIF-8, Al(fumarate)(OH), SIFSIX-3-Zn, SIFSIX-3-Cu, UiO-66-NH$_2$, UiO-66, Zr(fumarate), ZIF-67, MOF-5, IRMOF-3, UiO-67, CAU-10, SIFSIX-3-Ni, MIL-53, MIL-101, NOTT-100, PCN-14, SIFSIX-3-Co, ZIF-90, ZIF-7, BIT-101, Mg-formate, TIFSIX-3-Ni, MIL-100, MOF-74, Cu-MOF-74, MOF-177, CuBTTri, IRMOF-3, MOF-5CH3, PCN-222, and UiO-66-CH3.

3. A process as claimed in claim 1, wherein the metal-organic framework is HKUST-1 or Cu-MOF-74.

4. A process as claimed in claim 1, wherein the first reactant is a nitrate, nitrite, sulfate, hydrogen sulphate, oxide, halide, acetate, oxide, hydroxide, benzoate, alkoxide, carbonate, acetylacetonate, hydrogen carbonate, fluoride, chloride, bromide, iodide, phosphate, hydrogen phosphate or dihydrogen phosphate salt.

5. A process as claimed in claim 1, wherein the first reactant is copper (II) hydroxide.

6. A process as claimed in claim 1, wherein the at least one metal in ionic form is selected from $Li^+$, $Na^+$, $K^+$, $Mg^{2+}$, $Ca^{2+}$, $Sr^+$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Cr^{4+}$, $Cr^{6+}$, $Mo^{3+}$, $Mo^{6+}$, $W^{3+}$ $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pd^{4+}$, $Pt^{2+}$, $Pt^+$, $Pt^{4+}$, $Cu^{2+}$, $Cu^+$, $Ag^+$, $Au^+$, $Au^{3+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$ and $Bi^+$, a lanthanide ions including $La^{3+}$, $Ce^{3+}$, $Ce^{4+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, and actinide ions including $Th^{3+}$, $Pa^{3+}$, $U^{3+}$, $U^{6+}$, $Np^{3+}$, $Pu^{3+}$, $Am^{3+}$, $Cm^{3+}$, $Bk^{3+}$, $Cf^{3+}$, $Es^{3+}$, $Fm^{3+}$, $Md^{3+}$, $No^{3+}$ and $Lr^{3+}$.

7. A process as claimed in claim 1, wherein the at least one metal in ionic form is $Cu^{2+}$.

8. A process as claimed in claim 1, wherein the at least one ligand capable of associating with the metal in ionic form is either an organic ligand selected from carboxylates, imidazoles, sulfonates, phosponates, peptides, carboranes, polyoxymetalates, heterocycles, and derivatives thereof; and mixtures thereof; or an inorganic ligand selected from $SiF_6$, $TiF_6$ and oxalate and mixtures thereof.

9. A process as claimed in claim 1, wherein the at least one ligand capable of associating with the metal in ionic form is a trimesate.

10. A process as claimed in claim 1, wherein the solution comprises a solvent selected from methanol, ethanol, acetone, isopropanol, hexane, heptane, water and mixtures thereof.

11. A process as claimed in claim 1, wherein in step (c) the mixing is under conditions of prolonged and sustained pressure and shear.

12. A process as claimed in claim 11, wherein the conditions of prolonged and sustained pressure and shear are applied by an extrusion process.

13. A process as claimed in claim 1, wherein in step (c) the mixing is carried out at a temperature of less than 150° C.

14. A process as claimed in claim 1 additionally comprising, after step (c), the step of:
   (d) drying the metal-organic framework.

15. A process as claimed in claim 14 additionally comprising, after step (c) or step (d), the step of:
   (e) forming a shaped body comprising the metal-organic framework.

16. A process as claimed in claim 1, wherein the metal-organic framework is Cu-MOF-74.

\* \* \* \* \*